United States Patent
Chong et al.

(10) Patent No.: US 9,092,819 B2
(45) Date of Patent: Jul. 28, 2015

(54) METHOD, SYSTEM, AND MEDIUM OF CONTROLLING A VISUALLY PERCEPTIBLE OUTPUT IN RELATION TO A VIRTUAL GIFT

(71) Applicant: eBay Inc., San Jose, CA (US)

(72) Inventors: Choon Chong, San Francisco, CA (US); Trisha Lee Okubo, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/975,132

(22) Filed: Aug. 23, 2013

(65) Prior Publication Data

US 2013/0346239 A1 Dec. 26, 2013

Related U.S. Application Data

(63) Continuation of application No. 13/525,098, filed on Jun. 15, 2012, now Pat. No. 8,560,397, which is a continuation of application No. 12/104,270, filed on Apr. 16, 2008, now Pat. No. 8,438,069.

(60) Provisional application No. 60/983,101, filed on Oct. 26, 2007, provisional application No. 60/957,645, filed on Aug. 23, 2007.

(51) Int. Cl.
*G06Q 30/00* (2012.01)
*G06Q 30/06* (2012.01)
*G06Q 50/00* (2012.01)
(Continued)

(52) U.S. Cl.
CPC ........ *G06Q 30/0641* (2013.01); *G06Q 30/0631* (2013.01); *G06Q 30/0643* (2013.01); *G06Q 30/08* (2013.01); *G06Q 50/01* (2013.01); *G06Q 30/02* (2013.01); *G06Q 30/06* (2013.01)

(58) Field of Classification Search
CPC .......... G06Q 30/0601–30/0643; G06Q 30/08; G06Q 50/01
USPC ....................................................... 705/319
See application file for complete search history.

(56) References Cited

U.S. PATENT DOCUMENTS

| | | | |
|---|---|---|---|
| 6,587,835 | B1 | 7/2003 | Treyz et al. |
| 6,745,178 | B1 | 6/2004 | Emens et al. |
| 6,968,179 | B1 | 11/2005 | DeVries |

(Continued)

FOREIGN PATENT DOCUMENTS

| | | |
|---|---|---|
| KR | 10-1160404 | 6/2012 |
| WO | WO-2009025855 A1 | 2/2009 |
| WO | WO-2009025856 A1 | 2/2009 |

OTHER PUBLICATIONS

"12 Questions with Kaboodle", [Online]. Retrieved from the Internet: <URL:http://www.shmula.com/230/12-questions-with-kaboodle>, (Oct. 23, 2006), 7 pgs.

(Continued)

*Primary Examiner* — William Allen
(74) *Attorney, Agent, or Firm* — Schwegman Lundberg & Woessner, P.A.

(57) ABSTRACT

Systems and a method to facilitate a purchase of an item on a network-based marketplace are described. The method generates, at a network-based marketplace platform, a virtual gift based on an item for sale at the network-based marketplace platform and communicates interface information to a network-based social platform that includes the virtual gift.

13 Claims, 16 Drawing Sheets

(51) Int. Cl.
*G06Q 30/08* (2012.01)
*G06Q 30/02* (2012.01)

(56) References Cited

U.S. PATENT DOCUMENTS

| | | | |
|---|---|---|---|
| 7,356,490 B1 | 4/2008 | Jacobi et al. | |
| 7,444,297 B2 | 10/2008 | Shah | |
| 7,707,122 B2 | 4/2010 | Hull et al. | |
| 7,716,089 B1 | 5/2010 | Gavarini | |
| 7,720,722 B2 | 5/2010 | Ho et al. | |
| 7,945,482 B2 | 5/2011 | Law et al. | |
| 8,001,010 B2 | 8/2011 | Ho et al. | |
| 8,417,577 B2 | 4/2013 | Law et al. | |
| 8,438,069 B2 * | 5/2013 | Chong et al. | 705/26.1 |
| 8,560,397 B2 | 10/2013 | Chong et al. | |
| 8,725,573 B1 * | 5/2014 | Narang et al. | 705/15 |
| 2004/0172456 A1 | 9/2004 | Green et al. | |
| 2005/0102227 A1 | 5/2005 | Solonchev | |
| 2005/0154639 A1 | 7/2005 | Zetmeir | |
| 2005/0198031 A1 | 9/2005 | Pezaris et al. | |
| 2005/0276277 A1 | 12/2005 | Pace | |
| 2006/0026119 A1 | 2/2006 | Mirrashidi et al. | |
| 2006/0031869 A1 | 2/2006 | Bruner | |
| 2006/0085253 A1 | 4/2006 | Mengerink et al. | |
| 2006/0085259 A1 | 4/2006 | Nicholas et al. | |
| 2006/0117378 A1 | 6/2006 | Tam et al. | |
| 2006/0190281 A1 | 8/2006 | Kott et al. | |
| 2006/0293967 A1 | 12/2006 | Deluca et al. | |
| 2007/0106551 A1 | 5/2007 | McGucken | |
| 2007/0150359 A1 | 6/2007 | Lim et al. | |
| 2007/0150368 A1 | 6/2007 | Arora et al. | |
| 2007/0156594 A1 | 7/2007 | McGucken | |
| 2007/0168216 A1 | 7/2007 | Lemelson | |
| 2007/0208627 A1 | 9/2007 | Abadi | |
| 2007/0211047 A1 * | 9/2007 | Doan et al. | 345/419 |
| 2007/0239552 A1 | 10/2007 | Sundaresan | |
| 2007/0244769 A1 * | 10/2007 | Boesel | 705/26 |
| 2008/0040673 A1 | 2/2008 | Zuckerberg et al. | |
| 2008/0109239 A1 | 5/2008 | Harmon et al. | |
| 2008/0154632 A1 | 6/2008 | Jacobi et al. | |
| 2008/0189188 A1 | 8/2008 | Morgenstern | |
| 2008/0189189 A1 | 8/2008 | Morgenstern | |
| 2008/0228595 A1 | 9/2008 | Hill et al. | |
| 2008/0300982 A1 | 12/2008 | Larson et al. | |
| 2008/0301007 A1 | 12/2008 | Horel et al. | |
| 2008/0320004 A1 | 12/2008 | Jain et al. | |
| 2009/0055285 A1 | 2/2009 | Law et al. | |
| 2009/0055291 A1 | 2/2009 | Ho et al. | |
| 2009/0265253 A1 | 10/2009 | Gabriel et al. | |
| 2010/0023418 A1 | 1/2010 | Bader et al. | |
| 2010/0205066 A1 | 8/2010 | Ho et al. | |
| 2011/0145105 A1 | 6/2011 | Law et al. | |
| 2011/0264556 A1 | 10/2011 | Ho et al. | |
| 2011/0264557 A1 | 10/2011 | Ho et al. | |
| 2012/0253966 A1 | 10/2012 | Chong et al. | |
| 2013/0179948 A1 | 7/2013 | Ho et al. | |

OTHER PUBLICATIONS

"U.S. Appl. No. 11/963,426, Supplemental Notice of Allowance mailed Apr. 22, 2011", 4 pgs.
"U.S. Appl. No. 11/963,399, Final Office Action mailed Aug. 24, 2009", 25 pgs.
"U.S. Appl. No. 11/963,399, Non Final Office Action mailed Mar. 3, 2009", 15 pgs.
"U.S. Appl. No. 11/963,399, Notice of Allowance mailed Jan. 6, 2010", 15 pgs.
"U.S. Appl. No. 11/963,399, Response filed Jun. 3, 2009 to Non Final Office Action mailed Mar. 3, 2009", 18 pgs.
US 8,209,230, 06/2012, Chong et al. (withdrawn).
"U.S. Appl. No. 11/963,399, Response filed Oct. 27, 2009 to Final Office Action mailed Aug. 24, 2009", 10 pgs.
"U.S. Appl. No. 11/963,426, Examiner Interview Summary mailed Nov. 25, 2009", 3 pgs.
"U.S. Appl. No. 11/963,426, Final Office Action mailed May 13, 2010", 15 pgs.
"U.S. Appl. No. 11/963,426, Non Final Office Action mailed Mar. 3, 2009", 15 pgs.
"U.S. Appl. No. 11/963,426, Non Final Office Action mailed Aug. 27, 2009", 26 pgs.
"U.S. Appl. No. 11/963,426, Notice of Allowance mailed Nov. 15, 2010", 15 pgs.
"U.S. Appl. No. 11/963,426, Preliminary Amendment filed Mar. 21, 2008", 3 pgs.
"U.S. Appl. No. 11/963,426, Response filed Jun. 3, 2009 to Non Final Office Action mailed Mar. 3, 2009", 13 pgs.
"U.S. Appl. No. 11/963,426, Response filed Oct. 13, 2010 to Final Office Action mailed May 13, 2010", 10 pgs.
"U.S. Appl. No. 11/963,426, Response filed Nov. 25, 2009 to Non Final Office Action mailed Aug. 27, 2009", 10 pgs.
"U.S. Appl. No. 12/104,270, Advisory Action mailed Aug. 9, 2010", Advisory Action, 3 pgs.
"U.S. Appl. No. 12/104,270, Final Office Action mailed Mar. 30, 2011", 12 pgs.
"U.S. Appl. No. 12/104,270, Final Office Action mailed Jun. 1, 2010", 11 pgs.
"U.S. Appl. No. 12/104,270, Non Final Office Action mailed Jan. 29, 2010", 12 pgs.
"U.S. Appl. No. 12/104,270, Non Final Office Action mailed Dec. 16, 2010", 13 pgs.
"U.S. Appl. No. 12/104,270, Notice of Allowance mailed Mar. 7, 2012", 9 pgs.
"U.S. Appl. No. 12/104,270, Notice of Allowance mailed Dec. 31, 2012", 7 pgs.
"U.S. Appl. No. 12/104,270, Response filed Apr. 29, 2010 to Non Final Office Action mailed Jan. 29, 2010", 13 pgs.
"U.S. Appl. No. 12/104,270, Response filed May 27, 2011 to Final Office Action mailed Mar. 30, 2011", 14 pgs.
"U.S. Appl. No. 12/104,270, Response filed Aug. 2, 2010 to Final Office Action mailed Jun. 1, 2010", 14 pgs.
"U.S. Appl. No. 12/104,270, Response filed Mar. 16, 2011 to Non Final Office Action mailed Dec. 16, 2010", 14 pgs.
"U.S. Appl. No. 12/104,270, Supplemental Second Preliminary Amendment filed Aug. 31, 2012", 4 pgs.
"U.S. Appl. No. 12/767,666, Examiner Interview Summary mailed Jun. 13, 2011", 2 pgs.
"U.S. Appl. No. 12/767,666, Non Final Office Action mailed Dec. 8, 2010", 10 pgs.
"U.S. Appl. No. 12/767,666, Notice of Allowance mailed Jun. 13, 2011", 14 pgs.
"U.S. Appl. No. 12/767,666, Response filed Mar. 8, 2011 to Non-Final Office Action mailed Dec. 8, 2010", 11 pgs.
"U.S. Appl. No. 13/033,354, Final Office Action mailed May 24, 2012", 17 pgs.
"U.S. Appl. No. 13/033,354, Non Final Office Action mailed Dec. 7, 2011", 13 pgs.
"U.S. Appl. No. 13/033,354, Notice of Allowance mailed Dec. 11, 2012", 8 pgs.
"U.S. Appl. No. 13/033,354, Response filed Feb. 24, 2012 to Non Final Office Action mailed Dec. 7, 2011", 10 pgs.
"U.S. Appl. No. 13/033,354, Response filed Oct. 24, 2012 to Final Office Action mailed May 24, 2012", 12 pgs.
"U.S. Appl. No. 13/033,354, Supplemental Notice of Allowability mailed Jan. 15, 2013", 3 pgs.
"U.S. Appl. No. 13/177,336, Final Office Action mailed Jun. 21, 2012", 12 pgs.
"U.S. Appl. No. 13/177,336, Non Final Office Action mailed Jan. 19, 2012", 13 pgs.
"U.S. Appl. No. 13/177,336, Response filed Apr. 13, 2012 to Non Final Office Action mailed Jan. 19, 2012", 9 pgs.
"U.S. Appl. No. 13/177,341, Examiner Interview Summary mailed Sep. 20, 2012", 2 pgs.
"U.S. Appl. No. 13/177,341, Final Office Action mailed May 18, 2012", 14 pgs.
"U.S. Appl. No. 13/177,341, Non Final Office Action mailed Jan. 12, 2012", 13 pgs.

(56) References Cited

OTHER PUBLICATIONS

"U.S. Appl. No. 13/177,341, Response filled Apr. 12, 2012 to Non Final Office Action mailed Jan. 12, 2012", 10 pgs.
"U.S. Appl. No. 13/525,098, 312 Amendment filed Aug. 30, 2013", 7 pgs.
"U.S. Appl. No. 13/525,098, Final Office Action mailed Feb. 21, 2013", 7 pgs.
"U.S. Appl. No. 13/525,098, Non Final Office Action mailed Oct. 29, 2012", 10 pgs.
"U.S. Appl. No. 13/525,098, Notice of Allowance mailed May 30, 2013", 10 pgs.
"U.S. Appl. No. 13/525,098, PTO Response to Rule 312 Communication mailed Sep. 11, 2013", 2 pgs.
"U.S. Appl. No. 13/525,098, Response filed Jan. 29, 2013 to Non Final Office Action mailed Oct. 29, 2012", 10 pgs.
"U.S. Appl. No. 13/525,098, Response filed Apr. 22, 2013 to Final Office Action mailed Feb. 21, 2013", 10 pgs.
"U.S. Appl. No. 13/858,495, Non Final Office Action mailed Jun. 25, 2013", 9 pgs.
"FAQ section of kaboodle.com", [Online]. [Archived Aug. 13, 2006]. Retrieved from the Internet: <URL: http://web.archive.org/web/20060813110112/http://www.kaboodle.con/zd/help/faq.html>, (Aug. 13, 2006), 7 pgs.
"International Application Serial No. PCT/US2008/010003, International Preliminary Report on Patentability mailed Mar. 4, 2010", 7 pgs.
"International Application Serial No. PCT/US2008/010003, Search Report mailed Nov. 12, 2008", 4 pgs.
"International Application Serial No. PCT/US2008/010003, Written Opinion mailed Nov. 12, 2008", 4 pgs.
"International Application Serial No. PCT/US2008/010004, International Preliminary Report on Patentability mailed Mar. 4, 2010", 8 pgs.
"International Application Serial No. PCT/US2008/10004, International Search Report mailed Nov. 10, 2008", 5 pgs.
"International Application Serial No. PCT/US2008/10004, International Written Opinion mailed Nov. 10, 2008", 5 pgs.
"Kabodle.com: Get Started with Kaboodle", [Online]. [Archived Aug. 13, 2006]. Retrieved from the Internet: <URL: http://web.archive.org/web/20060813094114/www.kaboodle.com/zd/help/getStarted.html>, (Aug. 13, 2006), 10 pgs.
"Kaboodle Delivers eBay's New "My Collectibles" Destination", [Online]. Retrieved from the Internet: <URl: http://www.kaboodle.com/zm/pr3>, (Jun. 12, 2006), 2 pgs.
"Korean Application Serial No. 2010-7006376 Office Action filed Oct. 14, 2011", with English translation of claims, 8 pgs.
"Korean Application Serial No. 2010-7006376, Notice of Allowance mailed May 30, 2012", with English translation, 3 pgs.
"Korean Application Serial No. 2010-7006376, Response filed Dec. 14, 2011 to Office Action mailed Oct. 14, 2011", with English translation of claims, 32 pgs.
"The archived step-by-step Guide to Using Kaboodle section of the Kaboodle website dated Nov. 25, 2005", www.archive.org, (Aug. 19, 2009).
Halpern, Michelle, "In Your Face", Marketing 112. 13, (Jul. 16, 2007), 45-47.
Mason, Kerri, "Doing it for yourself: Dance Music Summit focuses on independence, self-reliance for artists, labels", BeatBox, Billboard, vol. 117, No. 42, (Oct. 15, 2005), 2 pgs.
"U.S. Appl. No. 13/783,583, Non Final Office Action mailed Oct. 3, 2013", 12 pgs.
"U.S. Appl. No. 13/783,583, Final Office Action mailed Jun. 3, 2014", 12 pgs.
"U.S. Appl. No. 13/783,583, Response filed Jan. 3, 2014 to Non Final Office Action mailed Oct. 3, 2013", 11 pgs.
"U.S. Appl. No. 13/783,583, Response filed Sep. 3, 2014 to Final Office Action mailed Jun. 3, 2014", 10 pgs.

* cited by examiner

METHOD, SYSTEM, AND MEDIUM OF CONTROLLING A VISUALLY PERCEPTIBLE OUTPUT IN RELATION TO A VIRTUAL GIFT

RELATED APPLICATIONS

This application is a continuation application that claims the priority benefit of U.S. application Ser. No. 13/525,098, filed Jun. 15, 2012 which is a continuation that claims the priority benefits of U.S. application Ser. No. 12/104,270, filed Apr. 16, 2008, which is a continuation that claims the priority benefits of U.S. Provisional Application No. 60/983,101, filed Oct. 26, 2007 and U.S. Provisional Application No. 60/957,645, filed Aug. 23, 2007, which applications are incorporated in their entirety herein by reference.

FIELD

Embodiments relate generally to the technical field of data communications and, in one example embodiment, to multi-computer data transferring.

BACKGROUND

Applications available on the Internet have progressed from facilitating a medium of information delivery to a venue for sales and more recently to a platform for social networking Online market places such as Amazon.com and eBay.com are examples of online sellers. Similarly, mySpace.com and Facebook.com are examples of social networking Merging a venue for sales with a social network platform presents challenges. Specifically, new challenges may be found in utilizing features available on marketplace on a social shopping platforms.

DETAILED DESCRIPTION

In the following description, for purposes of explanation, numerous specific details are set forth in order to provide a thorough understanding of an embodiment of the present disclosure. It will be evident, however, to one skilled in the art that the present disclosure may be practiced without these specific details.

Platform Architecture

Figure 1:
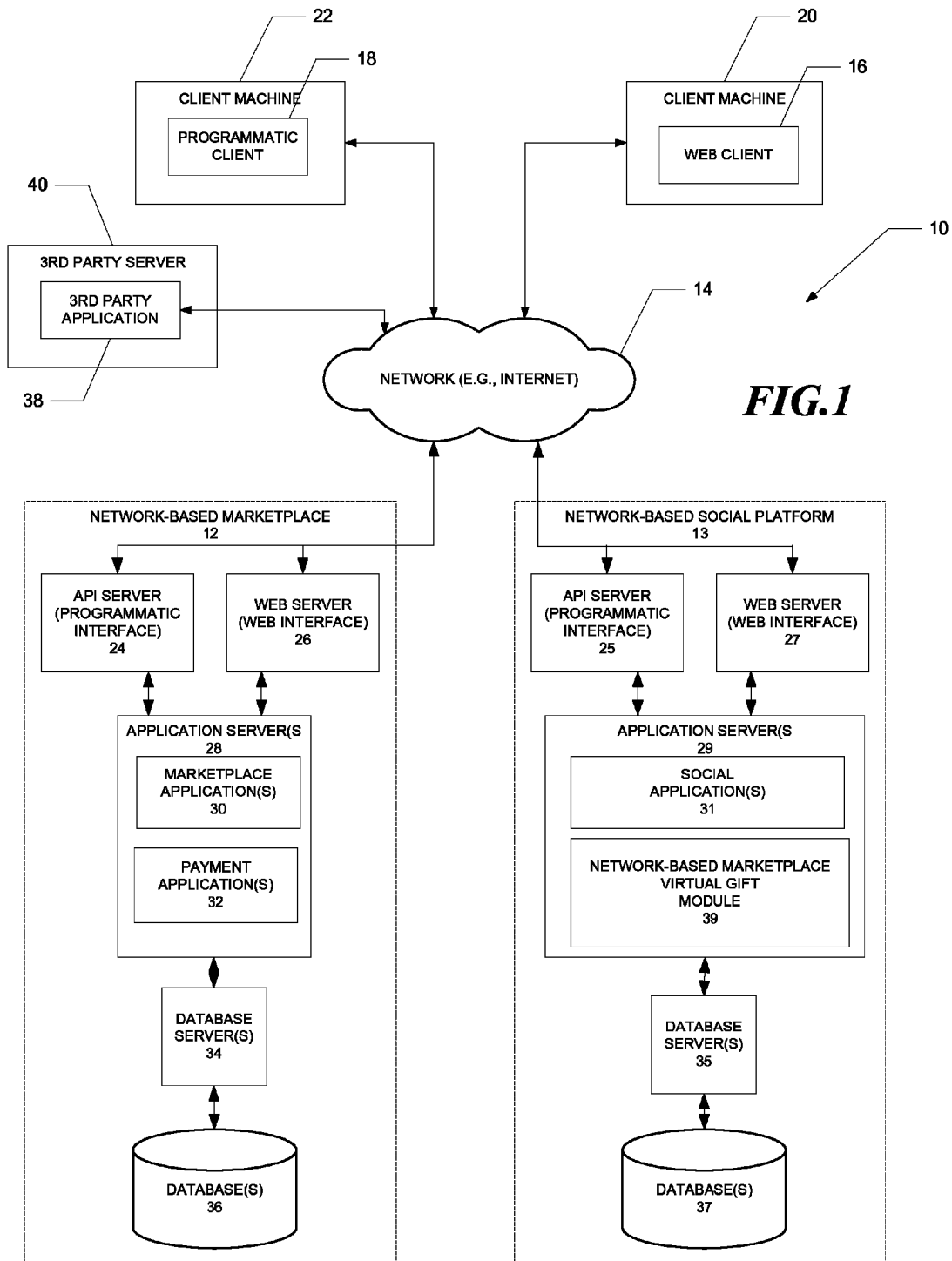
FIG. 1 is a network diagram depicting a system, according to one example embodiment, having a client-server architecture.

FIG. 1 is a network diagram depicting a system 10, according to one example embodiment of the present disclosure, having a client-server and a peer-to peer architecture. A social networking system facilitates shopping activity, in the example form of a network-based marketplace 12, and a network-based social platform 13 communicating over a network 14. The network-based marketplace 12 and the network-based social platform 13 communicate in peer-to peer architecture via programmatic interfaces. Further, the network-based marketplace 12 and the network-based social platform 13 respectively communicate in a client-server architecture with client machines 20, 22. The network-based marketplace 12, provides server-side functionality, via the network 14 (e.g., the Internet) to the one or more client machines 20 and 22. Similarly, the network-based social platform 13 provides server-side functionality, via the network 14 (e.g., the Internet) to the one or more client machines 20 and 22. FIG. 1 illustrates, for example, a web client 16 (e.g., a browser, such as the Internet Explorer browser developed by Microsoft Corporation of Redmond, Washington State), and a programmatic client 18 executing on respective client machines 20 and 22.

Turning specifically to the network-based social platform 13, an application program interface (API) server 25 and a web server 27 are coupled to, and provide programmatic and web interfaces respectively to, one or more application servers 29. The application servers 29 host one or more social applications 31 and a network-based interface module 33. The application servers 28 are, in turn, shown to be coupled to one or more databases servers 35 that facilitate access to one or more databases 37.

The social applications 31 provide a number of social networking functions and services to users that access the network-based social platform 13. For example, the social applications 31 may enable a user to store information in a profile that may be viewed at the client machines 20, 22 and to selectively grant access of the profile to other users who may also view the profile at the client machines 20, 22. The social applications 31 may provide criteria that may employed by a user to grant various levels of access to various levels of users. For example, a first user may access profile information associated with a second user responsive to the first user achieving the status of "friend" in relation to a second user. A user may achieve the status of friend by accepting an invitation from another user or by sending a request to a user that subsequently confirms the request.

The social applications 31 may further enable third party service providers to add "applications" on the network-based social platform 13. The "applications" may be utilized by one user to interact with another user. For example, a virtual gift application may be added by a third party service provider in the form of a network-based marketplace virtual gift module 39. The network-based marketplace virtual gift module 39 executes on the network-based social platform 13 to provide virtual gift services on the network-based social platform 13. In one embodiment, a user that has added a virtual gift application may give or send a virtual gifts to another user (e.g. friend) on the network-based social platform 13. The virtual gift may include a image of an item for sale on the network-based marketplace 12 and other information including the name of the giver of the virtual gift, a personal note, and the date and time the virtual gift was given. The giver of the virtual gift may identify the image in the virtual gift by selecting an item that is for sale (e.g., auction or purchase) on the network-based marketplace 12. The virtual gift and an optional personal note may both appear on various interfaces accessible to the recipient on other users on the network-based social platform 13. Further, the virtual gift application may enable a user on the network-based social platform to access the corresponding item on the network-based marketplace via the virtual gift. In one embodiment a user on the network-based social platform 13 may select the image included in the virtual gift to access the corresponding item for sale on the network-based marketplace 12 to purchase the item. For example, the user may purchase the item by entering a winning bid in an auction for the item or paying a predetermined price for the item. Accordingly, the virtual gift application facilitates the interaction between users on the network-based social platform 13 by enabling the users to exchange virtual gifts that respectively correspond to items on the network-based marketplace that may be purchased on the network-based marketplace 12. Accordingly, a virtual gift may facilitate purchase of a corresponding item on a network-based marketplace.

The network-based social platform 13 may be embodied as FACEBOOK ® services, a social utility that connects people with friends and others who work, study and live around them provided by Facebook of Palo Alto, Calif.

The web client 16, it will be appreciated, accesses the various social applications 31 via the web interface supported by the web server 27. Similarly, the programmatic client 18 accesses the various services and functions provided by the social applications 31 via the programmatic interface provided by the API server 25.

Turning to the network-based marketplace 12, an application program interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present disclosure, the payment applications 32 may form part of a payment service that is separate and distinct from the marketplace 12. The network-based marketplace 12 may be embodied as eBAY, the worlds online marketplace, provided by eBay of San Jose, Calif.

Further, while the system 10 shown in FIG. 1 employs a client-server architecture and a peer-to-peer architecture, the present disclosure is of course not limited to such architectures, and could equally well find application in any combination of client-server, distributed, or peer-to-peer, architecture systems. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings (e.g., items) on the marketplace 12 in an off-line manner, and to perform batch-mode communications between the programmatic client 18 and the network-based marketplace 12.

It will be appreciated that the marketplace applications 30, payment applications 32, social applications 31 and the network-based marketplace interface module may execute on a single platform. Accordingly, in one embodiment, the aforementioned applications/module may execute on the network-based marketplace 12 and in another embodiment the aforementioned applications/module may execute on the network-based social platform 13.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Figure 2:
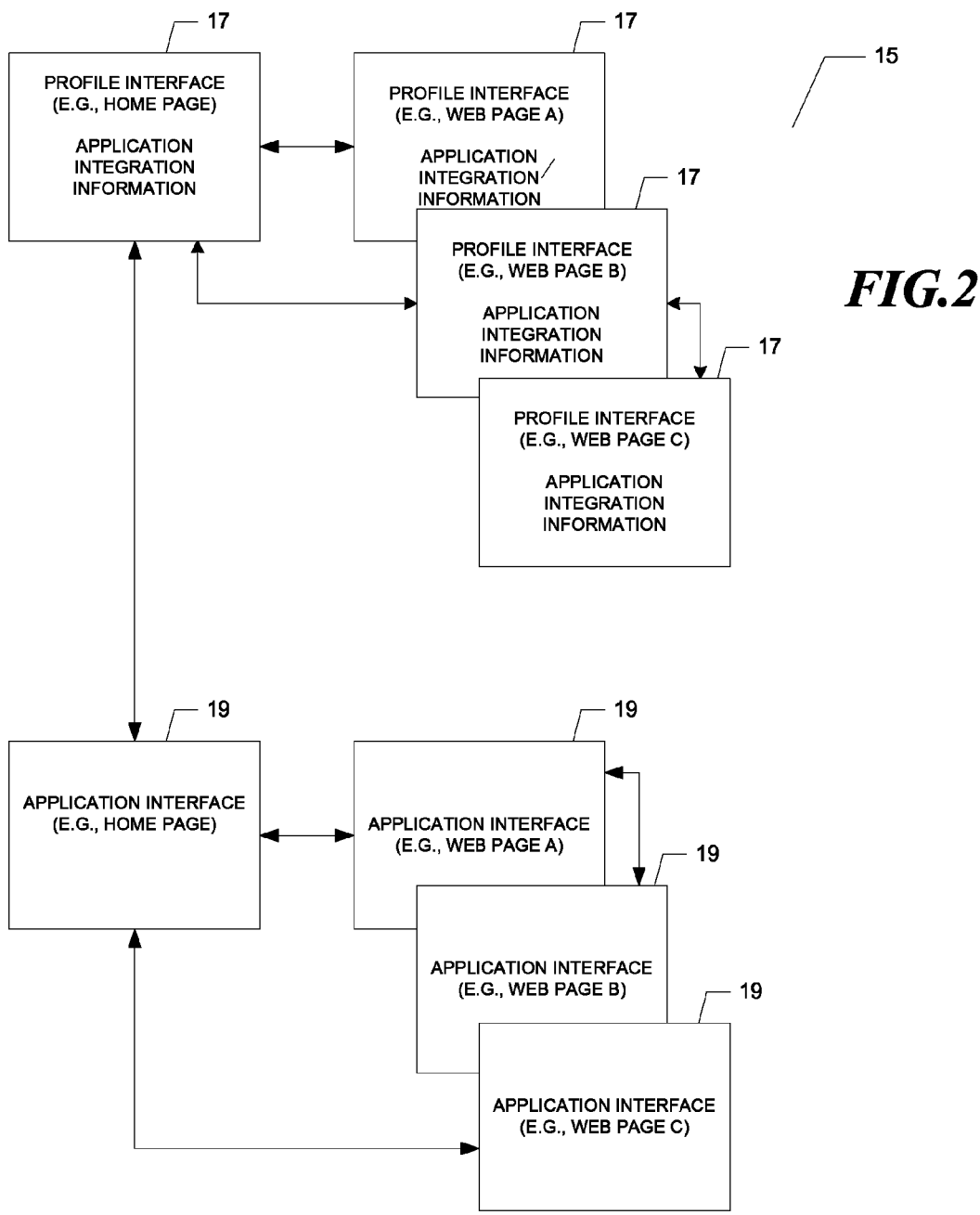
FIG. 2 is a block diagram depicting application and profile interfaces, according to one example embodiment.

FIG. 2 is a block diagram depicting profile interfaces 17 and application interfaces 19, according to one example embodiment. The profile interfaces 17 and application interfaces 19 may be used to access various features provided by the network-based social platform 13. Specifically, the profile interfaces 17 may be used to access the features generally provided to users of the network-based social platform 13 and the application interfaces 19 may be used to access features supported by applications that users may optionally add to the network-based social platform 13. For example, the virtual gift application previously mentioned may be associated with a set of application interfaces 19. The profile interfaces 17 are shown to be connected by arrows that represents links that may enable the user to move from one profile interface 17 to another profile interfaces 17 or from one profile interfaces 17 to an application interface 19. The profile interfaces 17 may include application integration information that may be provided by an application. For example, the virtual gift application may provide application integration information in the form of a link that may appear on a profile interface 17 enabling a request for an application interface 19 provided by the virtual gift application (e.g., home page). Also, for example, the virtual gift application may provide application integration information in the form of events that may appear on a profile interface 17 and chronicle the sending of a virtual gift.

It will be appreciated that while the above described profile interfaces 17 and application interfaces 19 may be described and illustrated in the present application as user interfaces other examples may include other types interfaces including audio interfaces, machine interfaces, media interfaces, virtual reality interfaces, etc. Further for example, where user interfaces may utilize user interface elements other types of interfaces may utilize other types of interface elements including, merely for example, audio interface elements, machine interface elements, media interface elements, virtual reality interface elements, etc.

Figure 3:
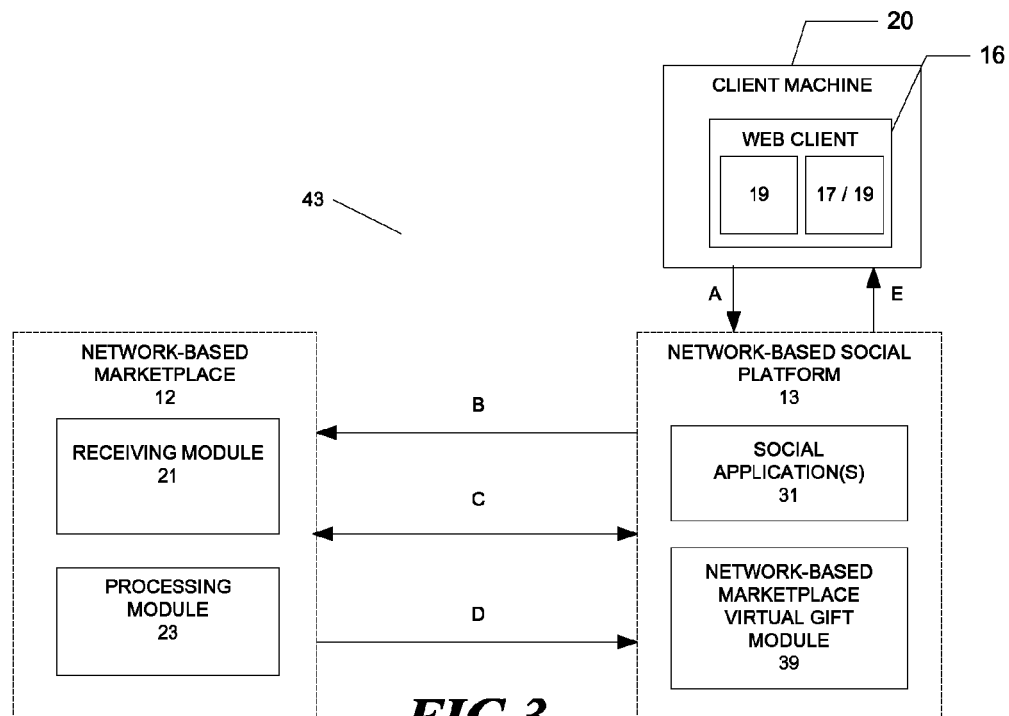
FIG. 3 is a network diagram depicting a system, according to one example embodiment, that processes a request received by an application interface received via a network-based social platform.

FIG. 3 is a network diagram depicting a system 43, according to one example embodiment, that processes a request received by an application interface 19 via a network-based social platform 13. The system includes a client machine 20, a network-based social platform 13, and a network-based marketplace 12. A web client 16, at the client machine 20, may receive a selection of a user interface element included on the application interface 19 that is communicated in a request to the network-based social platform 13. At the network-based social platform 13, the social applications 31 may receive and communicate the request (operation A) to the network-based marketplace virtual gift module 39 that, in turn, communicates the request to network-based marketplace 12 (operation B).

At the network-based marketplace 12, the request may be received by the receiving module 21 that, in turn, communicates the request to the processing module 23 that processes the request or communicates with other services provided by applications/modules on the network-based marketplace 12 that process the request. In some instances, the applications/modules at the network-based marketplace 12 may communicate with applications/modules on the network-based social platform 13 to service the request (operation C). Next, the processing module 23 may communicate a response (operation D) that may include interface information to the network-based marketplace virtual gift module 39.

At the network-based social platform 13, the network-based marketplace virtual gift module 39 receives the response and communicates the response including the interface information to the social applications 31. The social applications, in turn, generate a profile interface 17 or application interface 19 that may include the interface information and communicate the interface to the client machine 20 (e.g., operation E).

One having ordinary skill in the art will appreciate that another embodiment may include the receiving module 21 and the processing module 23 executing in a substantially similar manner on the network-based social platform 13.

Figure 4:
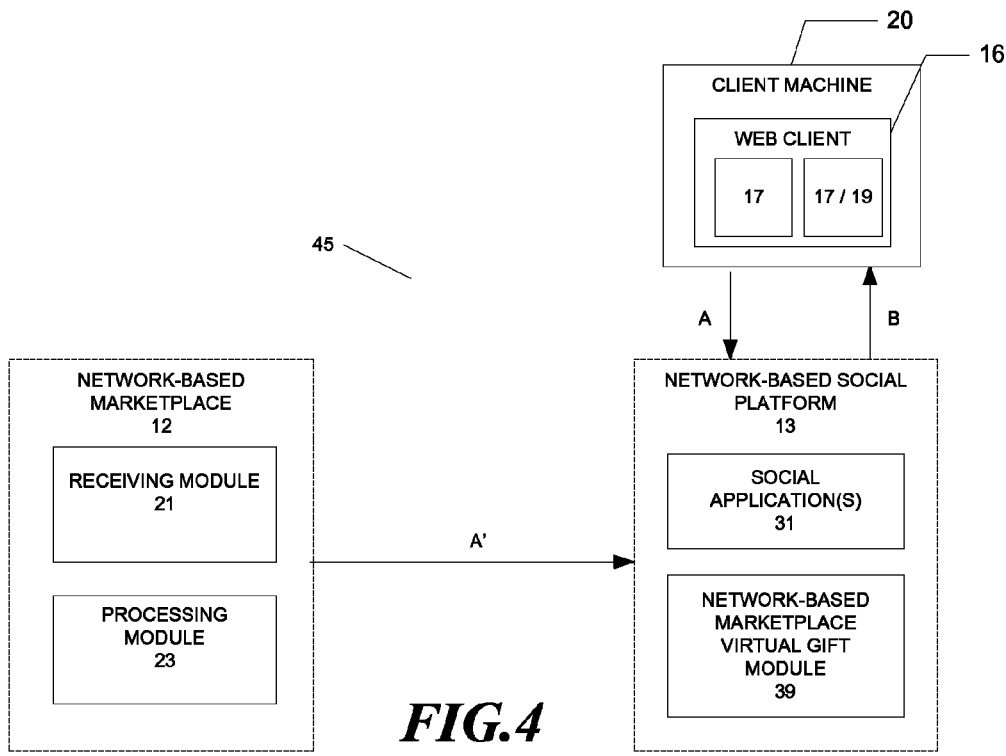
FIG. 4 is a network diagram depicting a system, according to one example embodiment, that processes a request received by a profile interface received via a network-based social platform.

FIG. 4 is a network diagram depicting a system 45, according to one example embodiment, that processes a request received by a profile interface 17 via a network-based social platform 13. The system 45 includes a client machine 20, a network-based social platform 13, and a network-based marketplace 12. A web client 16, at the client machine 20, may receive a selection of a user interface element from a profile interface 17 and communicate the selection in a request to the network-based social platform 13.

At the network-based social platform 13, the social applications 31 may receive and communicate the request (operation A) to the network-based marketplace virtual gift module 39.

At the network-based marketplace 12, the processing module 23 or services provided by applications/modules on the network-based marketplace 12 may communicate with applications/modules on the network-based social platform 13 (operation A'). For example, the applications/modules on the network-based marketplace 12 may communicate interface information to the applications/modules on the network-based social platform 13. The communication of interface information to the network-based social application may be asynchronous to the request that is received by the social applications 31.

At the network-based social platform 13, the social applications 31 may generate a profile interface 17 or application interface 19 that includes the interface information and communicate the interface information to the client machine 20 (e.g., operation E).

One having ordinary skill in the art will appreciate that another embodiment may include the receiving module 21 and the processing module 23 executing in a substantially similar manner on the network-based social platform 13.

Social Platform Applications

Figure 5:
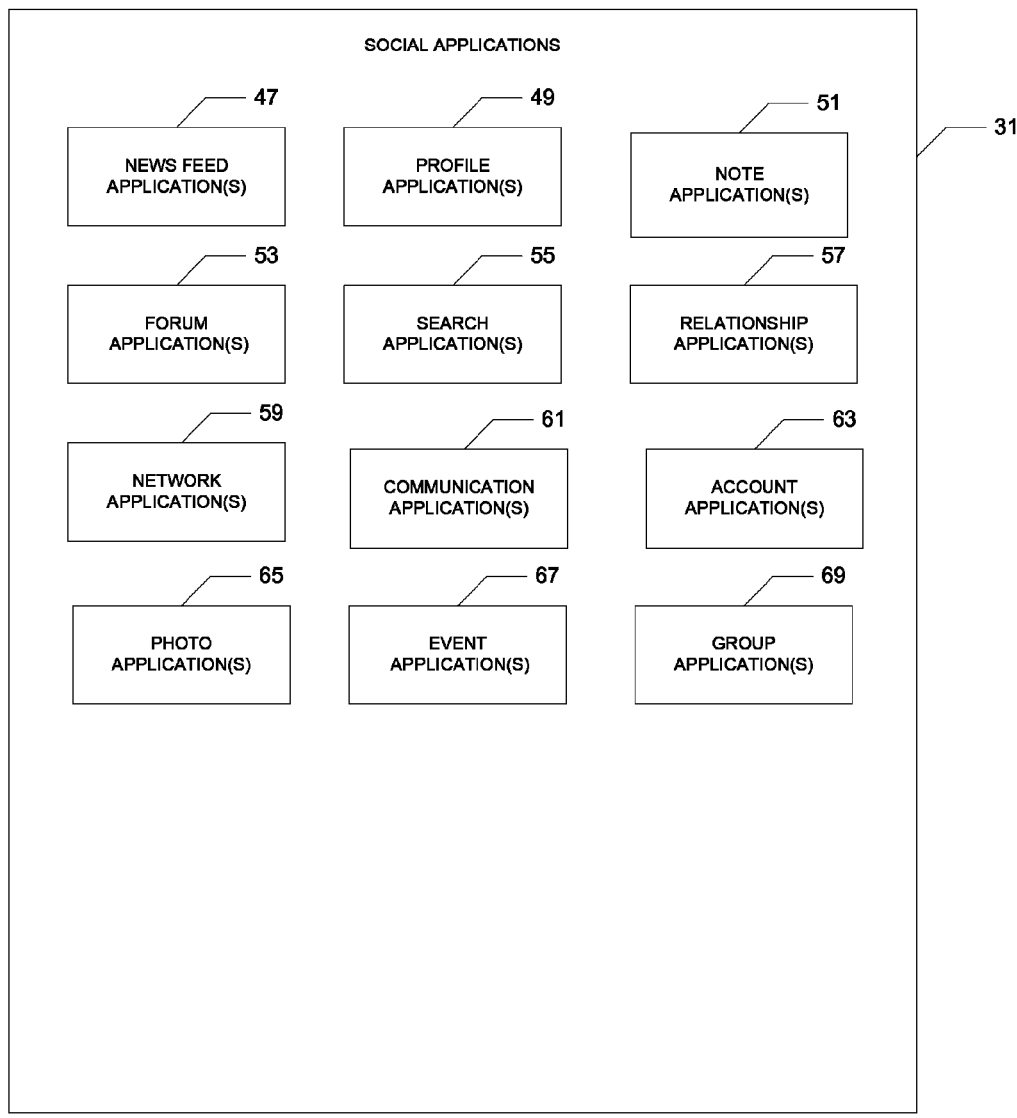
FIG. 5 is a block diagram illustrating social applications, according to an embodiment.

FIG. 5 is a block diagram illustrating social applications 31 that execute on the network-based social platform 13, according to an embodiment. The social applications 31 include news feed applications 47, profile applications 49, note applications 51, forum applications 53, search applications 55, relationship applications 57, network applications 59, communication applications 61, account applications 63, photo applications 65, event applications 67 and group applications 69.

The news feed applications 47 publish events associated with the user and friends of the user on the network-based social platform 13. The news feed applications 47 may publish the events on the user profile of a user. For example, the news feed applications 47 may publish the uploading of a photo album by one user on the user profile the user and the user profiles of friends of the user.

The profile applications 49 may maintain user profiles for each of the users on the network-based social platform 13. Further, the profile applications 49 may enable a user to restrict access to selected parts of their profile to prevent viewing by other users. The notes applications 51 may be used to author notes that may be published on various user interfaces.

The forum applications 53 may maintain a forum for users to post comments and display the forum via the profile associated with a user. The user may add comments to the forum, remove comments from the forum and restrict visibility to other users. In addition, other users may post comments to the forum. The search applications 55 may enable a user to perform a keyword search for users, groups, and events. In addition, the search applications 55 may enable a user to search for content (e.g. favorite movies) on profiles accessible to the user.

The relationship applications 57 may maintain relationship information for the users. The network applications 59 may facilitate the addition of social networks by a user, the social networks based on a school, workplace, or region or any social construct for which the user may prove an affiliation. The communication applications 61 may process incoming and outgoing messages, maintain an inbox for each user, facilitate sharing of content, facilitate interaction among friends (e.g., poking), process requests, process events, process group invitations and process communicating notifications.

The account applications 63 may provide services to facilitate registering, updating, and deleting user accounts. The photo applications 65 may provide services to upload photographs, arrange photographs, set privacy options for albums and tag photographs with text strings. The event applications 67 provides services to create events, review upcoming events, and review past events. The group applications 69 may be used to maintain group information, display group information, and navigate to groups.

Figure 6:
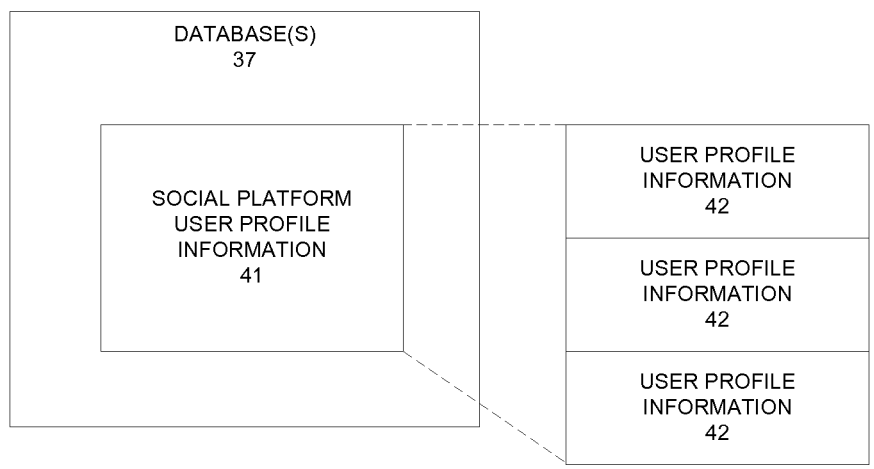
FIG. 6 is a block diagram illustrating a database, according to an embodiment, coupled to a network-based social platform.

FIG. 6 is a block diagram illustrating a database 37, according to an embodiment, coupled to a network-based social platform 13. The database 37 is shown to include social platform user profile information 41 that includes a user profile information entry for each user on the network-based social platform 13. The user profile information 42 entry may be used to store information that may be associated with the user. For example, the user profile information 42 may store information that may be displayed on a user profile user interface as described further below.

Marketplace Applications

Figure 7:
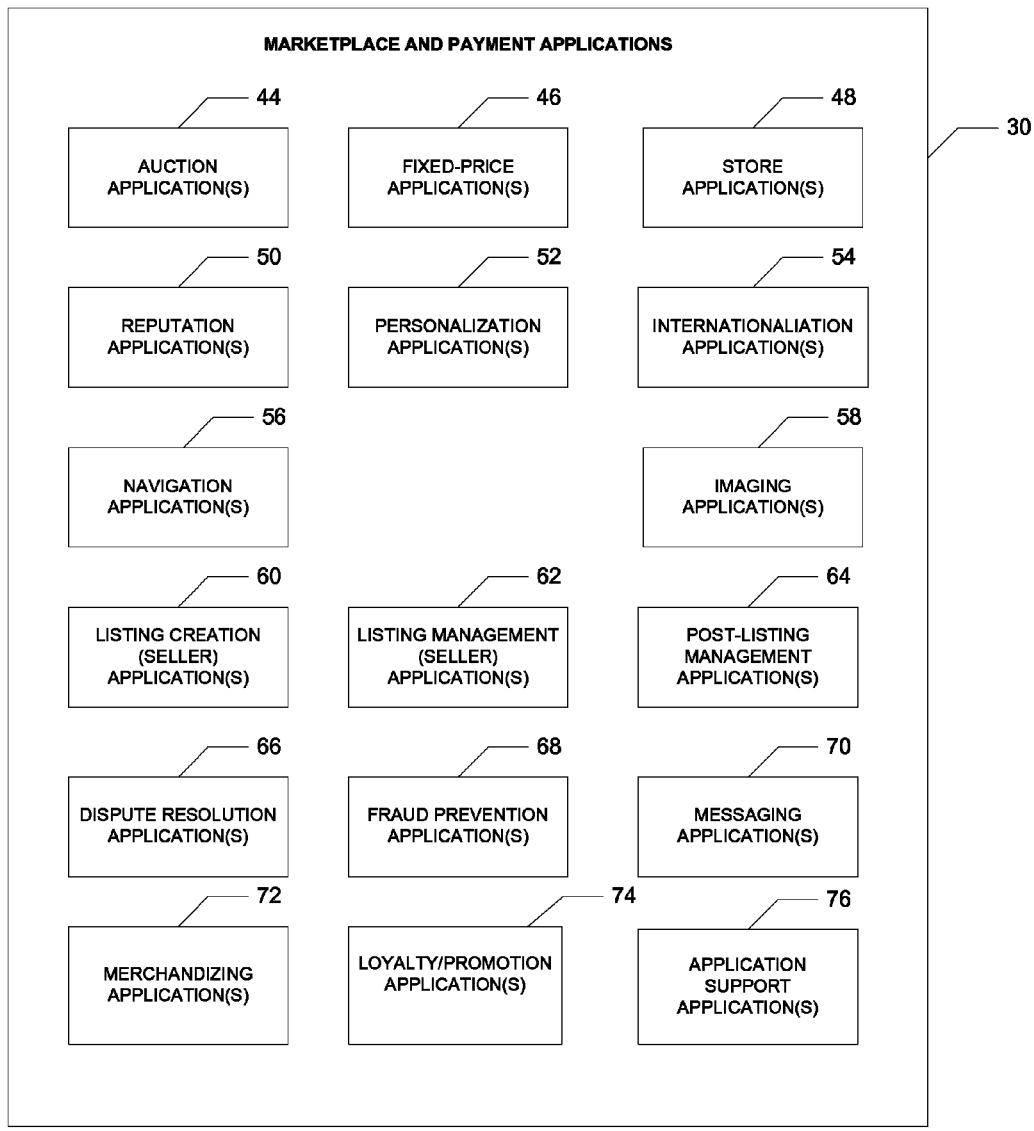
FIG. 7 is a block diagram illustrating marketplace and payment applications, according to an embodiment.

FIG. 7 is a block diagram illustrating multiple marketplace and payment applications 30 and 32 that, in one example embodiment of the present disclosure, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network-based marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items. Further the imaging applications 58 may support requests from the network-based social platform 13 for images associated with items that may be presented as virtual gifts to another user on the network-based social platform 13.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50. In addition, the post-listing management applications 64 may facilitate tracking and organization of listings for a user by maintaining select listings in lists.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 72 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Application support applications 76 may provide services that support applications on remote platforms. For example, the application support applications 76 may include a receiving module 21 and a processing module 23 that may be used to provide services to the virtual gift application described herein that operates on a remote platform such as a network-based social platform. In other embodiments, the virtual gift application may operate on other types of remote platforms including various communication hubs and forums that facilitate exchange of communications between users.

Data Structures

Figure 8:
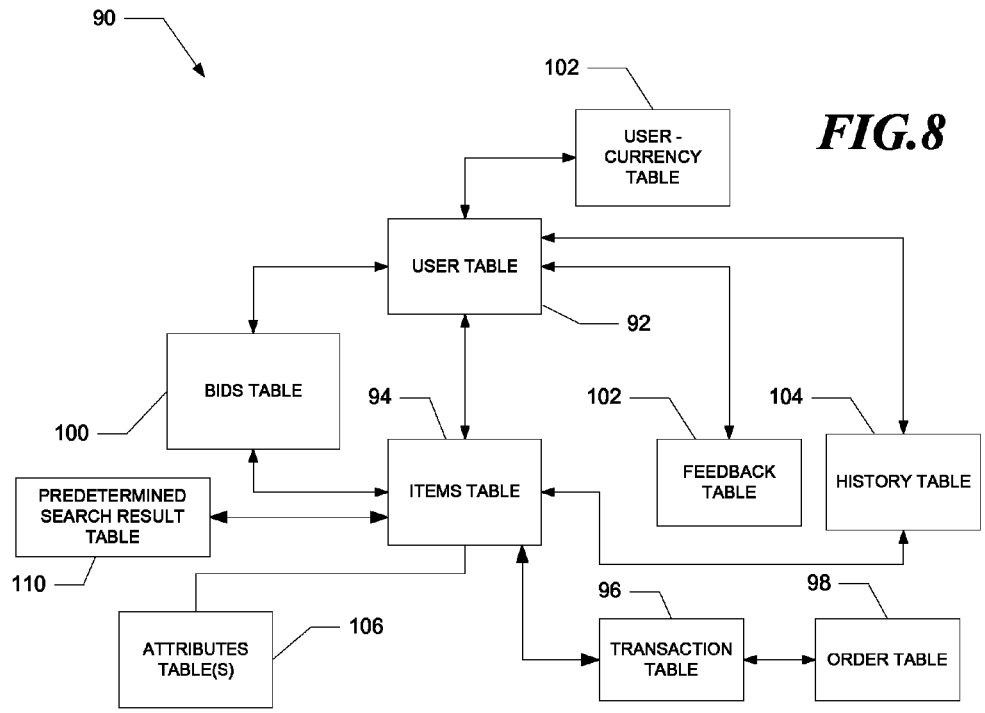
FIG. 8 is a block diagram illustrating information on a database, according to an embodiment, coupled to a network-based marketplace.

FIG. 8 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address information, financial information, account information pertaining to each such registered user. A user may, it will be appreciated, operate as a seller, a buyer, or both, within the network-based marketplace 12. In one example embodiment of the present disclosure, a buyer may be a user that has accumulated value (e.g., commercial or proprietary currency), and is then able to exchange the accumulated value for items that are offered for sale by the network-based marketplace 12. In one example embodiment of the present disclosure, each record in the user table 92 may further include information for other platforms such as the network-based social platform 13.

The tables 90 also include an items table 94 in which are maintained item records for listings of goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one example embodiment, to construct and maintain reputation information concerning users. In one embodiment, the reputation information may include feedback records associated with transactions. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller. A predetermined search result table 110 may include predetermined search results of images associated with items for sale on the network-based platform. The images may be communicated to a network-based social platform for display on the network-based social platform 13 and selection to create virtual gifts on the network-based social platform 13.

Figure 9A:
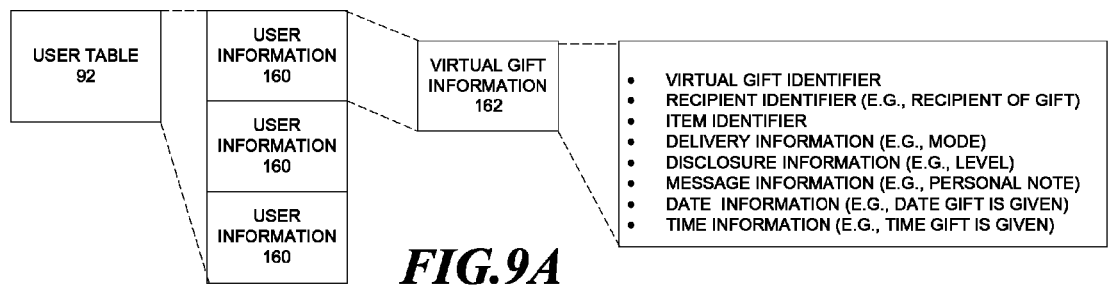
FIG. 9A is a block diagram illustrating a user table, according to an embodiment.

FIG. 9A is a block diagram illustrating a user table 92, according to an embodiment. The user table 92 may include a record for each user on the network-based marketplace in the form of a user information entry 160 (e.g., user records). Each user information entry 160 may include virtual gift information 162. The virtual gift information 162 may store one or more virtual gift information entries respectively associated with a virtual gift that has been given by the user. Each virtual gift includes a virtual gift identifier that identifies the virtual gift, a recipient identifier that identifies a recipient of the virtual gift, an item identifier that identifies an item in the items table 94 that includes an image used to generate the virtual gift, delivery information, message information that may contain a personal note from the user that sent the virtual gift, date information chronicling the date the virtual gift was given and time information chronicling the time the virtual gift was given.

The delivery information may be configured by the sender of the virtual gift who may specify a mode of delivery including a "public delivery", a "private delivery" or an "anonymous delivery." Selection of the "public delivery" mode may result in disclosure of the image, the personal note, and the identity of the sender to any user on the network-based social platform 13. Selection of "private delivery" mode may result in disclosure of the image and the identity of the sender to an user on the network-based social platform 13 but limits the disclosure of the personal note to the sender and receiver. Selection of "anonymous delivery" mode may result in disclosure of the image and the message to any user on the network-based social platform 13 but hides the identity of the sender.

The disclosure information may be configured by the receiver of the virtual gift to specify a level of disclosure including a "private" and "public" level of disclosure. Selection of the "private" level may result in hiding the name of the user that sent the gift and a personal note from the user. For example, the name and the personal note may be hidden from any user on the network-based social platform 13 other than the sender and the receiver of the virtual gift 292. Selection of the "public" level of disclosure may result in disclosing the name of the user that sent the gift and the personal note to any user on the network-based social platform 13.

Figure 9B:
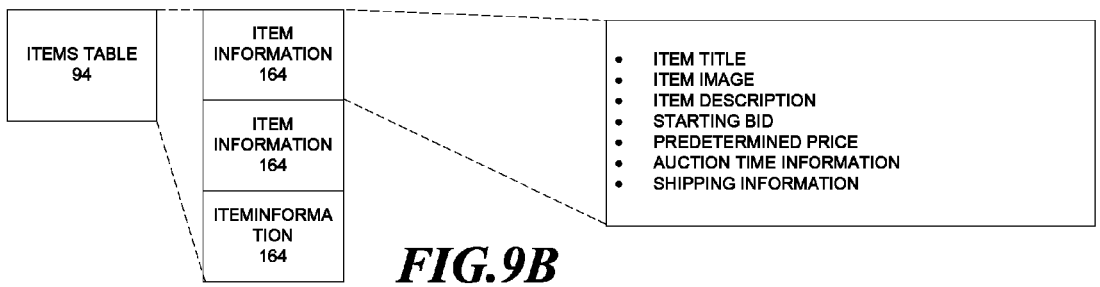
FIG. 9B is a block diagram illustrating an items table, according to an embodiment.

FIG. 9B is a block diagram illustrating an items table 94, according to an embodiment. The items table 94 may include a record for each item on the network-based marketplace 12 in the form of a item information entry 164 (e.g., item records). Each item information entry 164 may include an item title, an item image, an item description, a starting bid, a predetermined price to purchase the item, auction time information that may include the end time of the auction and shipping information that may include shipping costs.

Figure 10A:
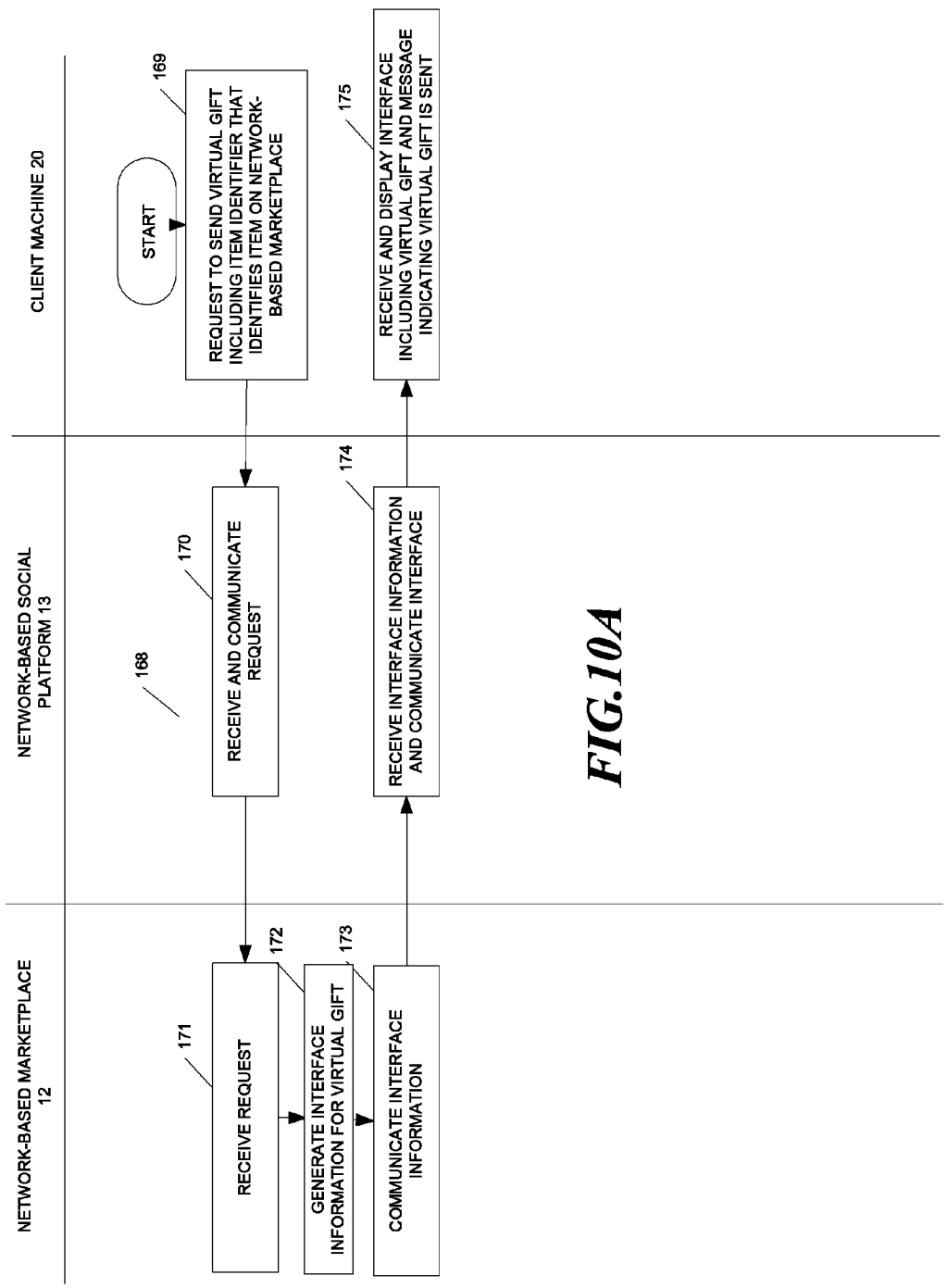
FIG. 10A is a block diagram illustrating a method, according to an embodiment, to generate a virtual gift based an item for sale on a network-based marketplace.

FIG. 10A is a block diagram illustrating a method 168, according to an embodiment, to generate a virtual gift based on an item for sale on a network-based marketplace. Illustrated on the right are operations performed a the client machine 20, illustrated in the middle are operations performed on the network-based social platform 13 and illustrated on the left are operations performed on the network-based marketplace 12.

The method 168 commences at the client machine 20, at operation 169, with a second user in the form of a giving user requesting to send a virtual gift to a first user in the form of a recipient user on the network-based social platform 13. The request may include an item identifier that identifies an item for sale on the network-based marketplace 12, a recipient identifier that identifies the recipient user that is to receive the virtual gift on the network-based social platform 13, delivery information that specifies a mode of delivery (e.g., public, private, anonymous), message information in the form of a personal note to the recipient user, and a sender identifier that identifies the sending user. In one embodiment, an image of the item may be selected from a set of predetermined search results that include images of items for sale on the network-based marketplace 12 that are respectively associated with item identifiers. For example, the predetermined search results may includes images of items generated in response to a search parameters for a holiday (e.g., Valentines Day, Halloween, Christmas, etc.) or a subject (humorous, stuffed animals, jewellery, etc.). In another embodiment, the user may enter keywords or other search parameters that may be used to identify items for sale on the network-based marketplace.

At operation 170, the network-based social platform 13 receives and communicates the request to the network-based marketplace 12. For example, at the network-based social platform 13, the social applications 31 may receive the request and the network-based marketplace virtual gift module 39 may communicate the request to the network-based marketplace 12.

At operation 171, at the network-based marketplace 12, the receiving module 21 receives the request and at operation 172, the processing module 23 may store the request and the current date and time in the user table 92. Next, the processing module 23 may use the an item identifier and other information in the request to generate the virtual gift. For example, the processing module 23 may generate interface information that includes a virtual gift including a virtual gift identifier, the name of the recipient user, an image that may be retrieved from the item table 94 based on the item identifier, and a personal message from the giving user. At operation 173, the processing module 23 may communicate the interface information to the network-based social platform 13.

At operation 174, at the network-based social platform 13, the network-based marketplace virtual gift module 39 receives the interface information and communicates the interface information to the social applications 31 that, in turn, generate a user interface based on the interface information and communicates the interface to the client machine 20.

At operation 175, at the client machine 20, the web client 16 may receive and displays the interface. In one embodiment, the interface may include the generated virtual gift, as described above, and the string, "Gift Sent!!"

Figure 10B:
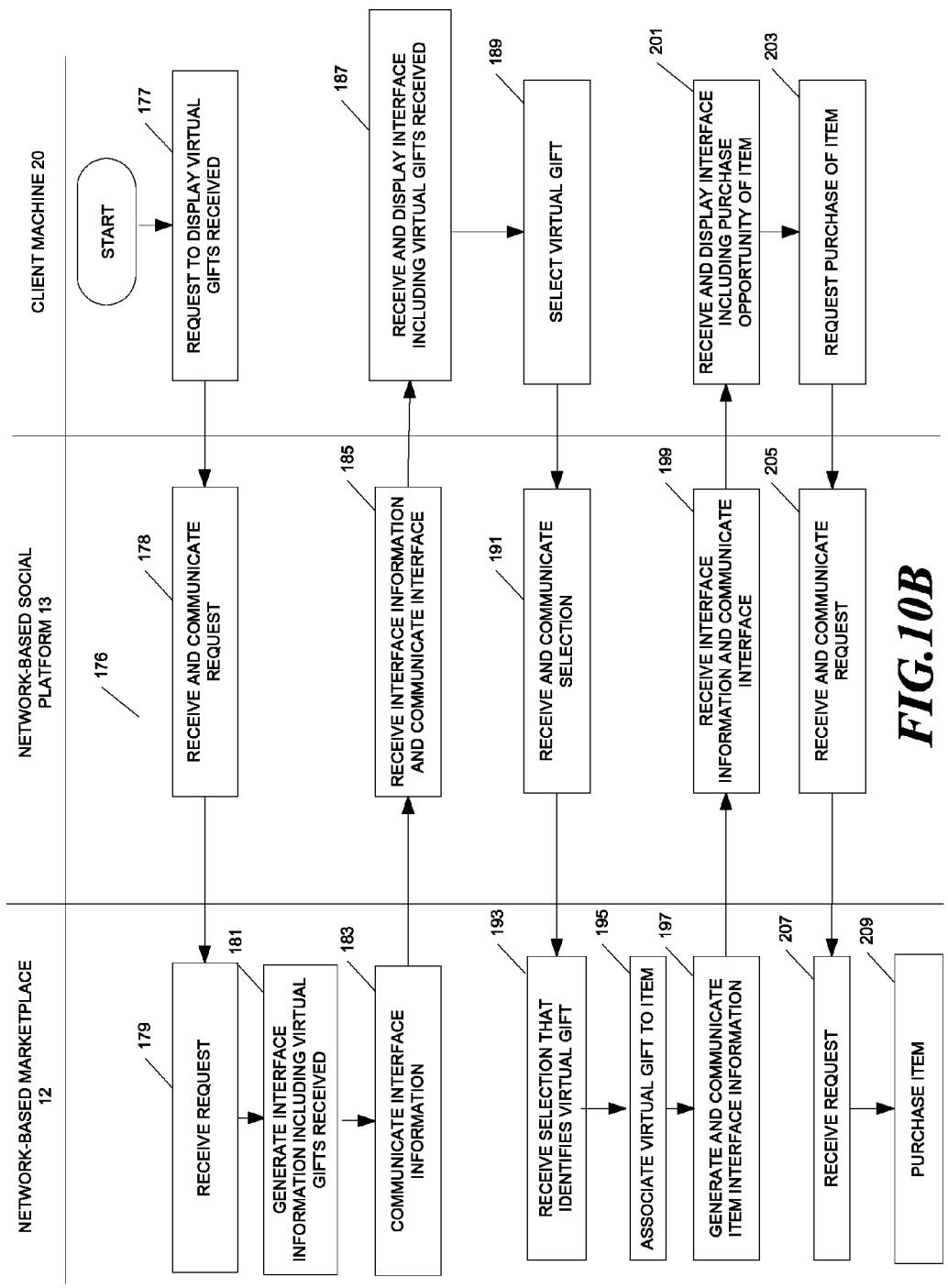
FIG. 10B is a block diagram illustrating a method, according to an embodiment, to facilitate a purchase of an item for sale on a network-based marketplace.

FIG. 10B is a block diagram illustrating a method 176, according to an embodiment, to facilitate a purchase of an item on a network-based marketplace. Illustrated on the right are operations performed a the client machine 20, illustrated in the middle are operations performed on the network-based social platform 13 and illustrated on the left are operations performed on the network-based marketplace 12. The method 176 commences at the client machine 20, at operation 177, with a first user in the form of a recipient user on the network-based social platform 13 requesting display of the virtual gifts received by the recipient user. The request may include a recipient identifier that identifies the recipient user.

At operation 178, the network-based social platform 13 receive and communicate the request to the network-based marketplace 12. For example, in one embodiment, the social applications 31 may receive the request and the network-based marketplace virtual gift module 39 may communicate the request to the network-based marketplace 12.

At operation 179, the receiving module 21, at the network-based marketplace 12, receives the request. At operation 181, the processing module 23 may use the recipient identifier to access the appropriate user information 160 in the user table 92 to generate interface information including the virtual gifts received by the recipient user. For each virtual gift the interface information may include a virtual gift identifier, an image of an item for sale on the network-based marketplace 12, the name of the giving user, a date and time the virtual gift was given and a set of controls. At operation 183, the processing module 23 may communicate the interface information to the network-based social platform 13.

At operation 185, the network-based social platform 13 receives the interface information and communicates an interface to the client machine 20. For example, at the network-based social platform 13 the network-based marketplace virtual gift module 39 receive the interface information that, in turn, communicates the interface information to the social applications 31 that, in turn, generates a user interface based on the interface information and communicates the interface to the client machine 20.

At operation 187, at the client machine 20, the web client 16 may receive and display the interface including one or more virtual gifts that have been received by the recipient user.

At operation 189, at the client machine 20, the recipient user may select a virtual gift to request access to a purchase opportunity of an item for sale on the network-based marketplace. For example, in one embodiment, the recipient user may request a purchase opportunity of an item by selecting an image included in a virtual gift. The selection may cause the web client 16, at the client machine, to communicate a request that includes a virtual gift identifier and a giving user identifier to the network-based social platform 13.

At operation 191, the network-based social platform 13 receives and communicate the request to the network-based marketplace 12. For example, in one embodiment, the social applications 31 may receive the request and the network-based marketplace virtual gift module 39 may communicate the request to the network-based marketplace 12.

At operation 193, the receiving module 21, at the network-based marketplace 12, receives the request. At operation 195, the processing module 23 may use the giving user identifier included in the request to access the appropriate user information 160 in the user table 92 to associate the virtual gift to the appropriate item. In one embodiment, the processing module 23 may use the item identifier stored in the user information that may be accessed based on the giving user identifier. In another embodiment, the processing module 23 may use a mapping mechanism to map the virtual gift identifier in the request to an item identifier. At operation 197, the processing module uses the appropriate item information 164 and the request to generate item interface information. The item interface information may include user interface elements that enable the purchase of the item on the network-based marketplace 12. At operation 197, the processing module 23 may communicate the item interface information to the network-based social platform 13.

At operation 199, the network-based social platform 13 receives item interface information and communicates an interface. For example, the network-based marketplace virtual gift module 39 may receive the item interface information and communicates the item interface information to the social applications 31 that, in turn, may generate an interface based on the item interface information and communicate the interface to the client machine 20.

At operation 201, at the client machine 20, the web client 16 may receive and display the interface including the item including user interface elements that enable purchase the item.

At operation 203, at the client machine 20, the recipient user may request a purchase the item. In the present example, the user may request a purchase by selecting a user interface element to pay a predetermined price. Another example of purchasing the item may include the user entering a winning bid amount and selecting a user interface element to submit the winning bid.

At operation 205, the network-based social platform 13 receives and communicates the request to the network-based marketplace 12. For example, in one embodiment, the social applications 31 may receive the request and communicate the request to the network-based marketplace virtual gift module 39 that may, in turn, communicate the request to the network-based marketplace 12.

At operation 207, the receiving module 21, at the network-based marketplace 12, receives the request and at operation 209, the processing module 23 may execute the purchase of the item for the user.

Figure 11:
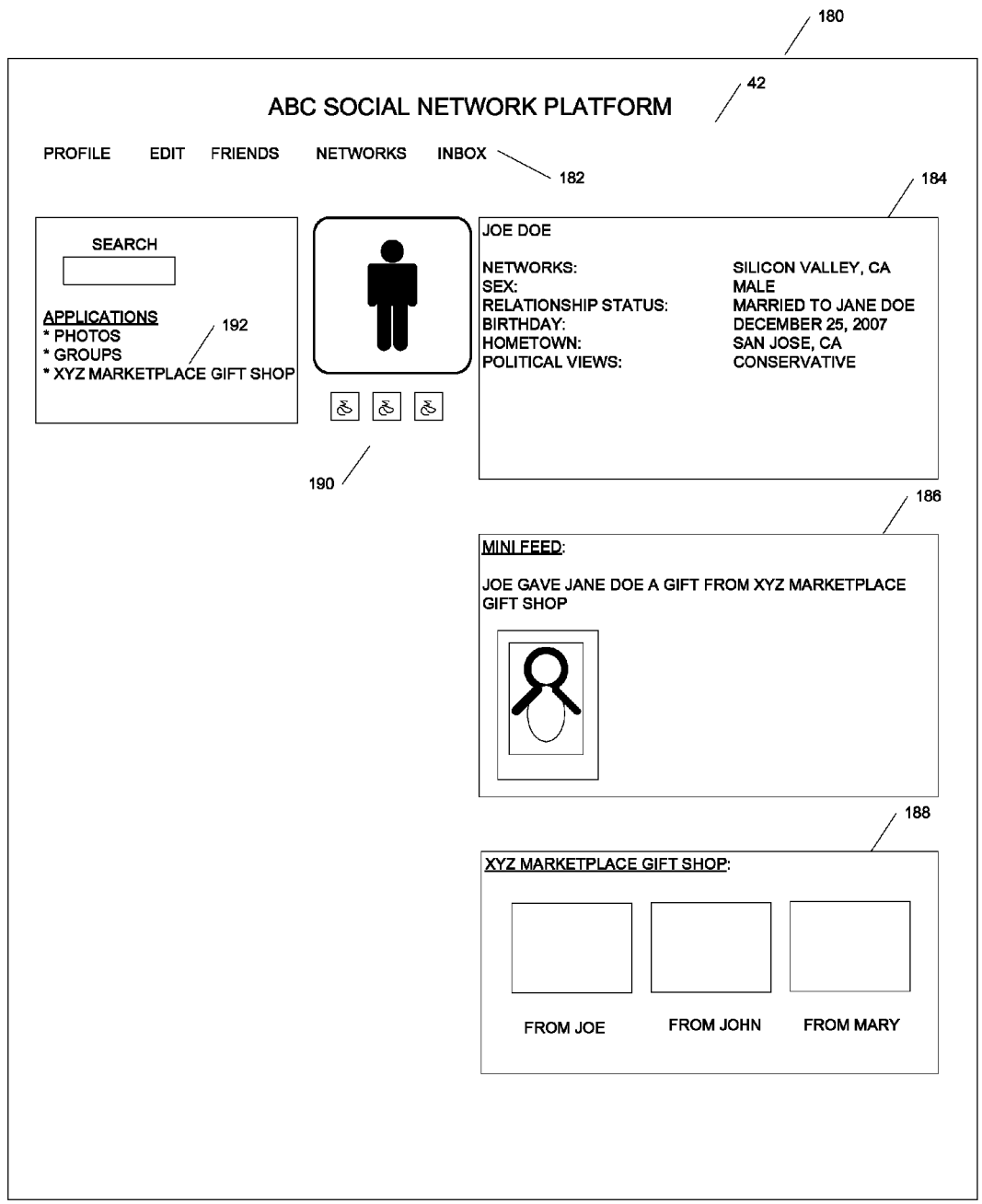
FIGS. 11-18 are diagrams illustrating user interfaces, according to an embodiment.

FIG. 11 is a diagram illustrating a user interface 180, according to an embodiment, of a user profile. The user interface 180 is a profile interface 17 that may include user profile information 42 for the user featured by the user profile, Joe Doe, and application integration information that includes interface information provided by the virtual gift application. The user interface 180 may be communicated by the network-based social platform 13 to the client machines 20, 22. User profile information 42 may also be displayed to other users on the network-based social platform 13 according to a status (e.g., "friend") associated with the respective user. In one embodiment, the status of a user may be used to identify a quantity of information (e.g., user profile information 42/application integration information) or a type of information (e.g., user profile information 42/application integration information) that is disclosed to the user. For example, a status of "favorite friend" may be associated with a greater level of disclosure of information than the status of "friend."

The user interface 180 includes controls 182 to navigate to other profile interfaces 17, user information 184, event information 186, virtual gift application information 188, application link information 190, and application navigation information. 192. The event information 186 may include application integration information for the virtual gift application in the form of events. For example, the user interface 180 includes a virtual gift and chronicles the user, Joe Doe, as giving a gift to Jane Doe. The virtual gift includes an image that may be selected to receive an interface that enables purchase of the corresponding item on the network-based marketplace 12. Further, the virtual gift application information 188, application link information 190, and application navigation information 192 respectively include application integration information for the virtual gift application. The virtual gift application information 188 may enable the display of virtual gifts that have been given by other users to the featured user, John Doe. Further, the application link information 190 and the application navigation information may respectively include user interface elements that that may be selected to enter the virtual gift application (e.g., XYZ Marketplace Gift Shop") via an application interface 19 provided by the virtual gift application.

Figure 12:
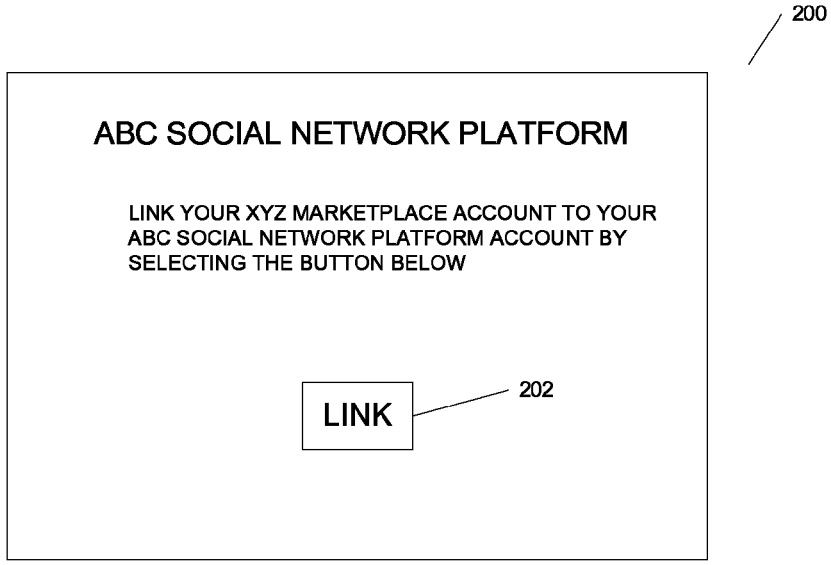

FIG. 12 is diagram illustrating a user interface 200, according to an embodiment, to enable account linking A user that desires to access features supported by the virtual gift application on the network-based social platform 13 may: A) enter a username and password that is authenticated by the network-based social platform 13, B) select a user interface element associated with the marketplace application on a user interface on the network-based social platform 13, C) select a user interface element to install the network-based marketplace virtual gift module 39 for the user on the network-based social platform 13, D) select a user interface element 202, as shown on the user interface 200, to link an account of the user on network-based marketplace 12 to an account of the user on the network-based social platform 13, and E) enter a username and password that is authenticated by the network-based marketplace 12. Accordingly, successful completion of the above mentioned activities results in linking of marketplace and social platform accounts to enable access to the virtual gift application on the network-based social platform 13.

Figure 13:
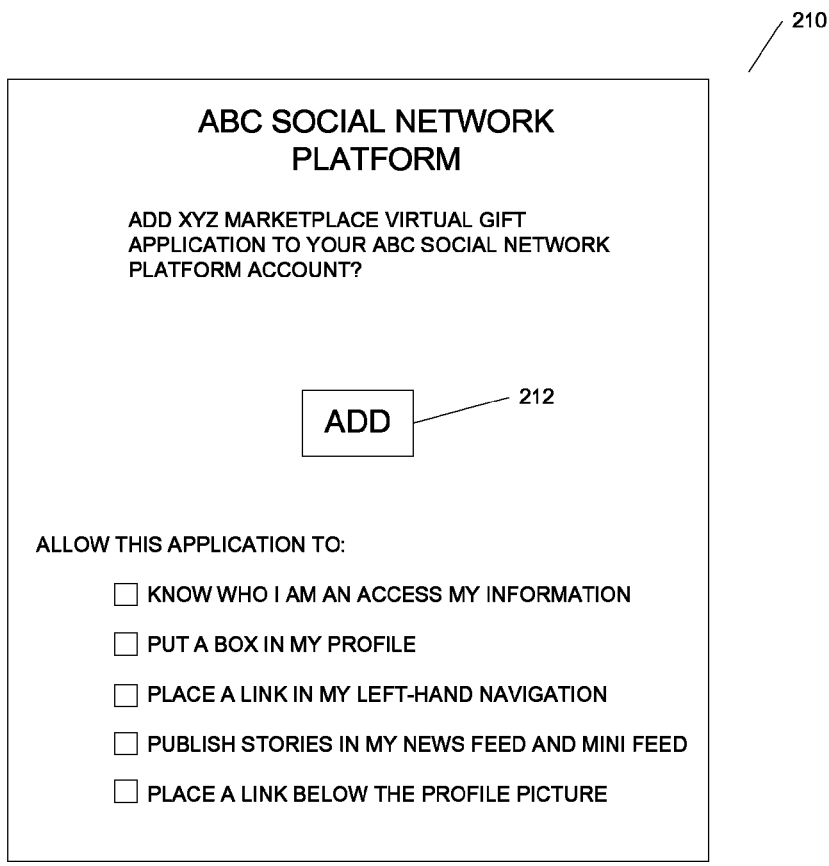

FIG. 13 is diagram illustrating a user interface 210, according to an embodiment to add the virtual gift application. The virtual gift application may be added on the network-based social platform 13 by selecting a user interface element 212 on the user interface 210. The user interface 210 further enables the configuration of features provided by the virtual gift application.

Figure 14:
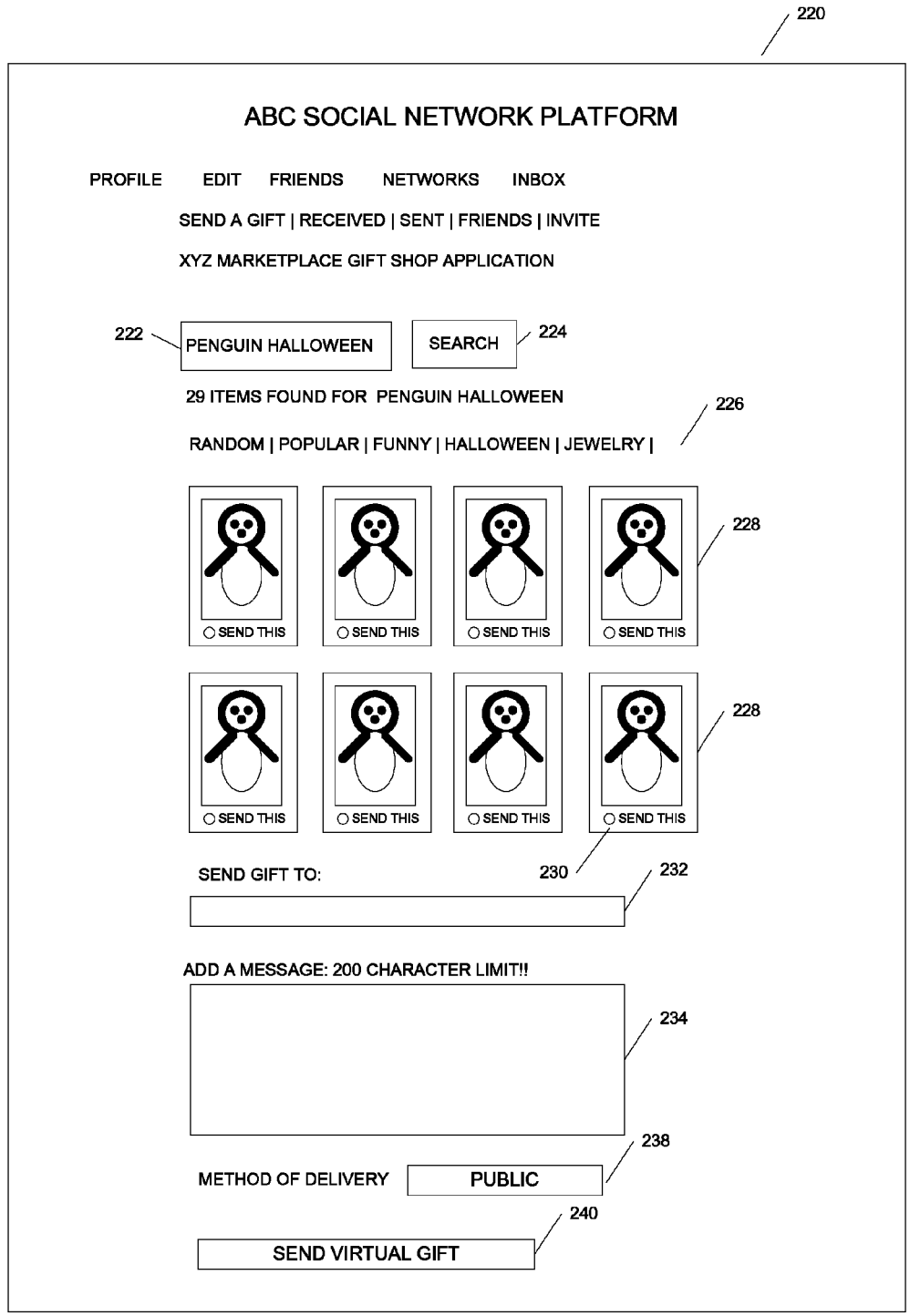

FIG. 14 is diagram illustrating a user interface 220, according to an embodiment, to send a virtual gift. The user interface 220 is an application interface 19 that includes interface information provided by the virtual gift application. The user interface 220 includes an input box 222 that may be used to enter keywords to search for items that are for sale on the network-based marketplace 12. The input box 222 is further associated with a user interface element 224 that may be selected to initiate the search. The search results may be displayed in the middle section of the user interface 220 as multiple images 228. The user interface 220 further includes user interface elements 226 that may be respectively selected to display items contained in predetermined search results that are stored in the predetermined search result table 110 on the network-based marketplace 12. For example, predetermined search results may include random items, popular items, funny items, Halloween items, jewelry items, etc.

The user interface 220 may include search results that include multiple images 228. Each image may be associated with a button 230 to identify the image 228 for inclusion in the generation of a virtual gift. Each image 228 further corresponds to an item for sale on the network-based marketplace 12 that may be purchased by entering a winning bin in an auction or paying a predetermined price.

The input box 232 may receive the name of the user on the network-based social platform to whom the virtual gift is being sent. The input box 234 may be used to receive a message information in the form of personal note that may be associated with the image 228 and communicated in the virtual gift to the recipient user. The pull down menu 238 may be used to select a method of delivery for the image 228 (e.g., "public delivery", "private delivery" or "anonymous delivery"), as previously described. The user interface element 240 may be selected to send the virtual gift.

Figure 15:
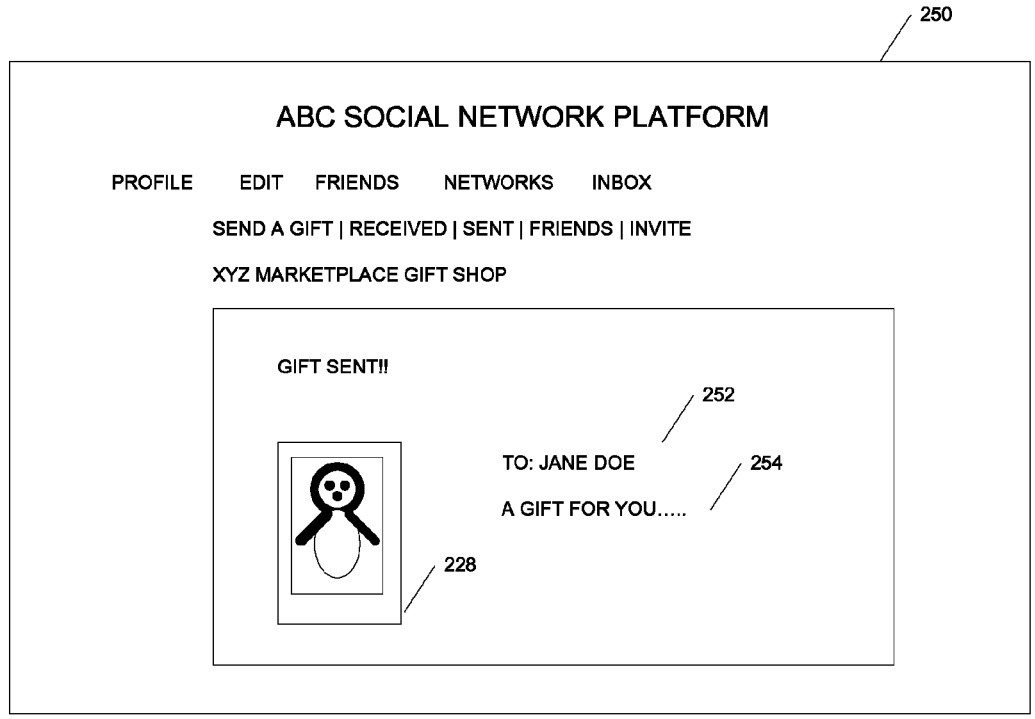

FIG. 15 is diagram illustrating a user interface 250, according to an embodiment, displayed to a sender of a virtual gift responsive to the user sending the virtual gift. The user interface 180 is an application interface 19 that includes interface information provided by the virtual gift application. The user interface 250 includes a text string 252 that identifies user that is to receive the virtual gift. The virtual gift is shown to include message information 254 including a personal note from the sender of the virtual gift and an image 228 that corresponds to an item for sale on the network-based marketplace 12. The image 228 may be selected to receive an interface that enables purchase of the corresponding item on the network-based marketplace 12.

Figure 16:
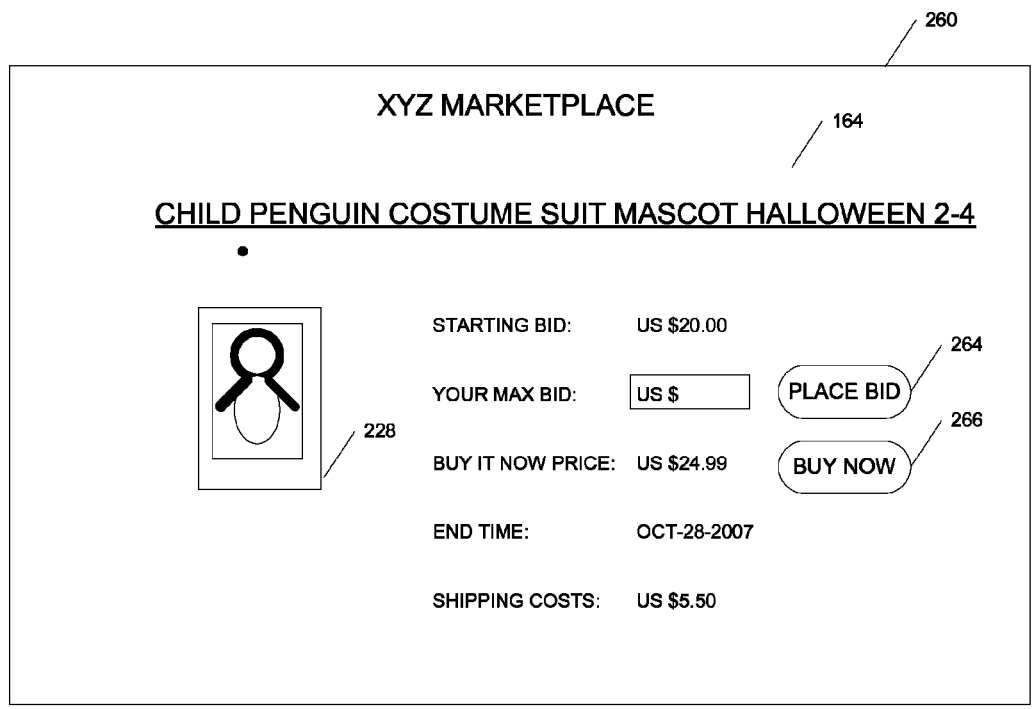

FIG. 16 is diagram illustrating a user interface 260, according to an embodiment. The user interface 260 may be communicated by the network-based marketplace 12. The user interface 260 appears as a pop-up that is displayed responsive to a selection of a virtual gift. In one embodiment, selection of an image 228 included in a virtual gift that appears on an application interface 19 communicated from the network-based social platform 13 to a client machine 20, 22 may cause display of the user interface 260. The user interface includes item information 164, as previously described, and user interface elements 264, 266 that may be selected to purchase the item. For example, the user interface element 264 may be selected to enter a winning bid to purchase the item and the user interface element 266 may be selected to purchase the item for a predetermined price.

Figure 17:
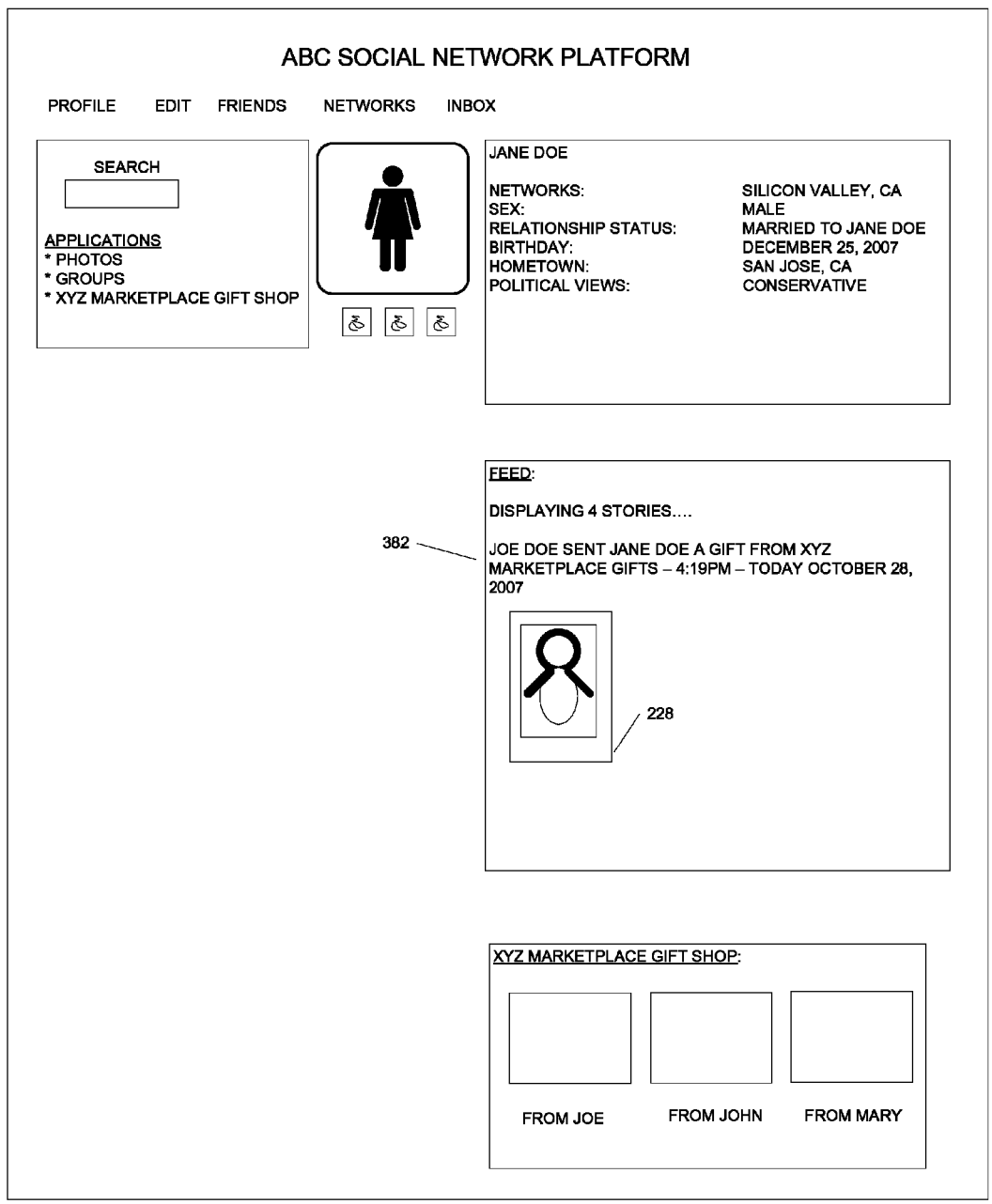

FIG. 17 is diagram illustrating a user interface 280, according to an embodiment, of a user profile of a user that has received a virtual gift. The user interface 280 is a profile interface 17 that may include user profile information and application integration information that includes interface information provided by the virtual gift application. The user interface 280 is a user profile featuring a user Jane Doe. The user interface 280 includes an event 282 including a virtual gift and chronicling Jane Doe's receipt of the virtual gift from Joe Doe. The image 228 may be selected to receive an interface that enables purchase of the corresponding item on the network-based marketplace 12.

Figure 18:
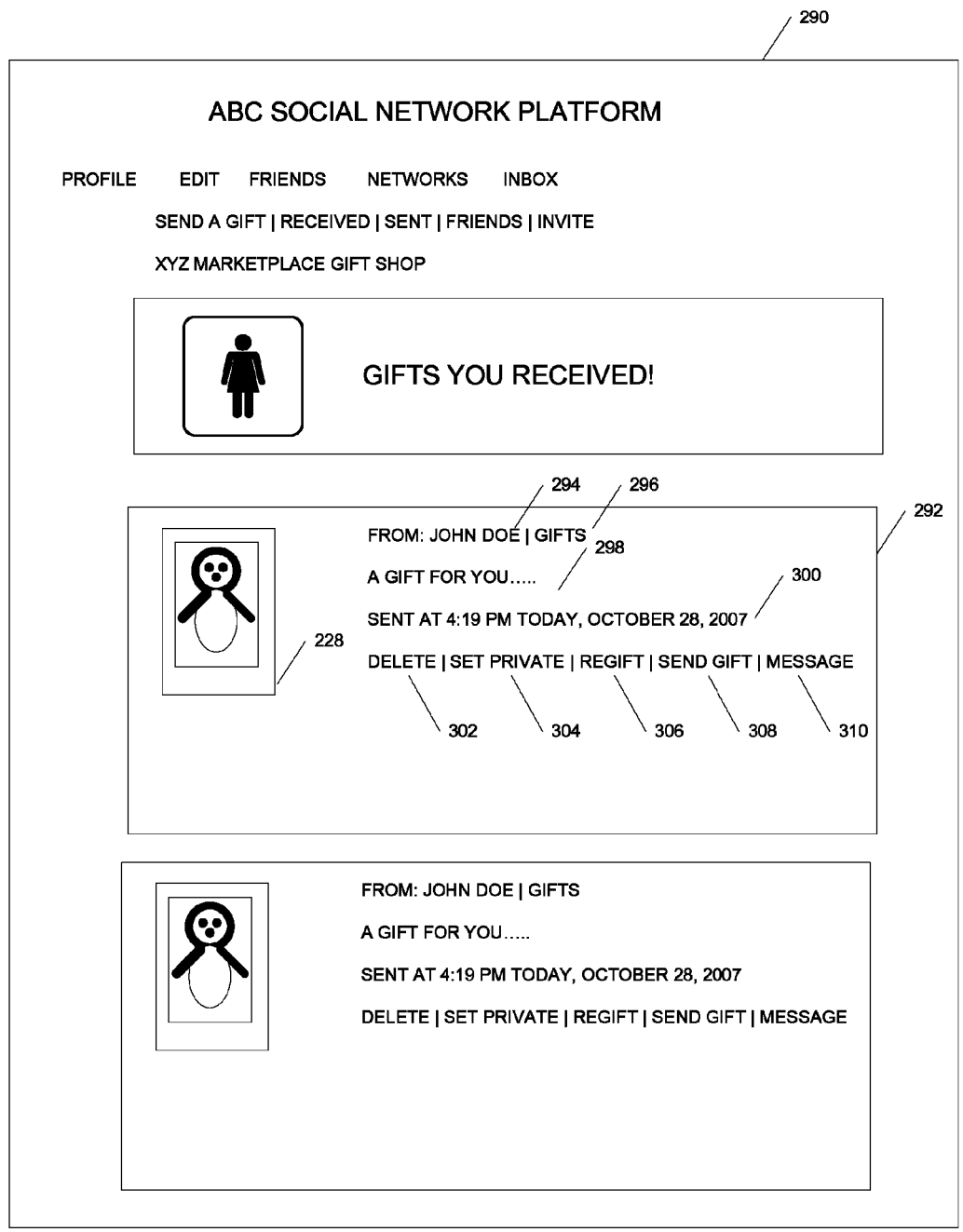

FIG. 18 is diagram illustrating a user interface 290, according to an embodiment, of received virtual gifts. The user interface 180 is an application interface 19 that includes interface information provided by the virtual gift application. The user interface 290 may include multiple virtual gifts 292. Each virtual gift 292 may include an image 228 of an item for sale on the network-based marketplace 12, a name 294 of a user on the network-based social platform 13 that sent the virtual gift, an interface control 296 selectable to display the virtual gifts received by the sender of the virtual gift 292, a personal note 298 from the user that sent the virtual gift, a date and time 300 the virtual gift was given, and interface controls including interface controls 302, 304, 306, 308, and 310. The image 228 may be selected to receive an interface that enables purchase of the corresponding item on the network-based marketplace 12.

The interface control 302 may be selected to delete the virtual gift 292. The interface control 304 may be selected to configure disclosure information for the virtual gift 292. as previously described. The interface control 306 may be selected to regift or send the virtual gift 292 to another user on the network-based social platform 13 that has added the virtual gift application. The interface control 308 may be selected to send a different virtual gift 292 to another user on the network-based social platform 13 that has added the virtual gift application. The interface element 310 may be selected to send a message to any user on the network-based social platform 13.

Figure 19:
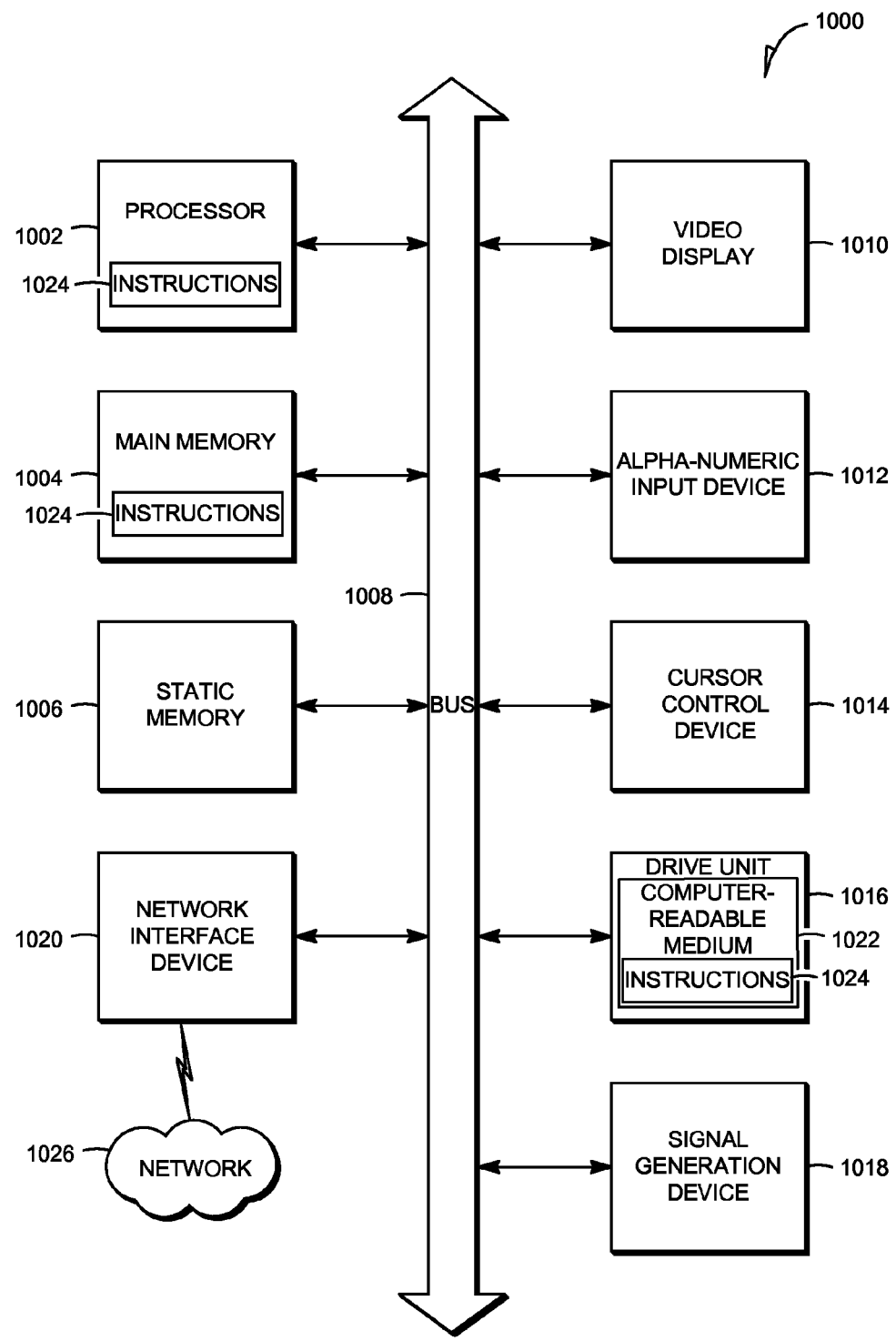
FIG. 19 is a block diagram of a machine, according to an example embodiment, including instructions to perform any one or more of the methodologies described herein.

FIG. 19 is a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Technology

The methods and systems describe herein may be embodied in any one or more of the following technologies.

JavaScript

JavaScript is a client side object scripting language used by millions of Web pages and server applications. With syntax similar to Java and C++, JavaScript may behave as both a procedural and object oriented language. JavaScript is interpreted at run time on the client computer and provides various features to a programmer. Such features include dynamic object construction, function variables, dynamic script creation, and object introspection. JavaScript is commonly used to provide dynamic interactivity to Web-pages and interact with a pages' DOM hierarchy.

JSON

JSON is an acronym for JavaScript Object Notation, and is a lightweight data exchange format. Commonly used in AJAX applications as an alternative to XML, JSON is human readable and easy to handle in client side JavaScript. A single function call to eval( )turns a JSON text string into a JavaScript object. Such objects may easily be used in JavaScript programming, and this ease of use is what makes JSON a good choice for AJAX implementations.

AJAX

AJAX is an acronym for Asynchronous JavaScript and XML but has become synonymous for JavaScript applications that use the HTTP Request object. AJAX allows websites to asynchronously load data and inject it into the website without doing a full page reload. Additionally AJAX enables multiple asynchronous requests before receiving results. Overall the capability to retrieve data from the server without refreshing the browser page allows separation of data and format and enables greater creativity in designing interactive Web applications.

HTML Push/Comet

Comet is similar to AJAX insomuch that it involves asynchronous communication between client and server. However, Comet applications take this model a step further because a client request is no longer required for a server response.

Java NIO

Java NIO is an acronym for Java's New Input Output package, and is a new API that provides improved performance in such areas as buffer management, scalable network I/O, and file I/O. In particular, an NIO package may support non-blocking socket and file I/O. Non-blocking sockets remove the one socket per thread per client limitations of traditional web server implementations. This allows web servers using the NIO package to service multiple clients with a limited number of sockets and threads

XSL

XSL is a transformation language that may be used to express XML in a different format. Similar to CSS, an XSL document describes how to format an XML hierarchy into HTML or other formats. Generally XSL is used to generate dynamic HTML pages from XML input.

Other Technologies

An example embodiment may be implemented as a dynamic interface and use a set of tools consistent with this platform. In one embodiment, the server technology may include Tomcat and utilize custom java servlets which interface with a MYSQL database. In one embodiment, the communication protocol used for client server communication may be XML. XML may be transformed on the client side by XSL documents. The interface itself may use AJAX to dynamically load content into the interface without refreshing.

Modules, Components and Logic

Certain embodiments are described herein as including logic or a number of modules, components or mechanisms. A module, logic, component or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

What is claimed is:

1. A method of controlling a visually perceptible output, comprising:
generating at a network-based marketplace platform, a virtual gift based on an item for sale at the network-based marketplace platform, the generating being performed at least in part by one or more processors;
generating, by a processor, interface information including the virtual gift, the interface information enabling purchase of the item on the network-based marketplace platform, the generating the interface information further comprising generating a message including a name of a sender of the virtual gift;
communicating, by a processor at the network-based marketplace platform, the interface information to a network-based social platform,
the interface information including an interface element that is configured to enable, upon selection, a purchase of the item on which the virtual gift is based from the network-based marketplace platform, the network-based marketplace platform and the network-based social platform being different platforms on a network;
controlling, by a processor at the network-based marketplace platform, a visually perceptible output representing the name of the sender of the virtual gift, the controlling being implemented based on the interface information such that the interface information causes the output representing the name of the sender of the virtual gift to be suppressed from display.

2. The method of claim 1, further comprising receiving, at the network-based marketplace platform, a request from the sender of the virtual gift, the request identifying the item as being published on a user interface that is hosted by the network-based marketplace platform, the item further being offered for sale on the network-based marketplace platform.

3. The method of claim 2, wherein the receiving the request includes receiving a selection from the sender of the virtual gift via an interface provided by the network-based social platform to the sender of the virtual gift.

4. The method of claim 1, further comprising generating item interface information that enables a recipient of the virtual gift to purchase the item on the network-based marketplace for a predetermined price.

5. The method of claim 1, further comprising generating item interface information that enables a recipient of the virtual gift to purchase the item on the network-based marketplace by entering a winning bid.

6. A system to control a visually perceptible output comprising:
one or more servers configured to provide a network-based marketplace platform, the network-based marketplace platform configured to:
generate a virtual gift based on an item for sale at the network-based marketplace platform;
generate interface information including the virtual gift and a message that includes a name of a sender of the virtual gift, the interface information to enable purchase of the item on the network-based marketplace platform;
communicate the interface information to a network-based social platform, the interface information including an interface element that is configured to enable, upon selection, a purchase of the item on which the virtual gift is based from the network-based marketplace platform, the network-based marketplace platform and the network-based social platform being different platforms on a network;
control a visually perceptible output that represents the name of the sender of the virtual gift based on the interface information such that the interface information causes the output that represents the name of the sender of the virtual gift to be suppressed from display.

7. The system of claim 6, wherein the network-based marketplace platform is further configured to receive a request from the sender of the virtual gift, the request identifies the item as published on a user interface that is hosted by the network-based marketplace platform, the item is further offered for sale on the network-based marketplace platform.

8. The system of claim 7, wherein the network-based marketplace platform is further configured to receive a selection from the sender of the virtual gift via an interface provided by the network-based social platform to the sender of the virtual gift.

9. The system of claim 6, wherein the network-based marketplace platform is further configured to generate item interface information that enables a recipient of the virtual gift to purchase the item on the network-based marketplace for a predetermined price.

10. The system of claim 6, wherein the network-based marketplace platform is further configured to generate the item interface information that enables a recipient of the virtual gift to purchase the item on the network-based marketplace by entering on a winning bid.

11. The system of claim 6, wherein the network-based marketplace platform is further configured to receive a request to purchase the item for sale on the network- based marketplace.

12. The system of claim 11, wherein the network-based marketplace platform further configured to receive a request to purchase the item for a predetermined price.

13. A non-transitory machine-readable medium for controlling a visually perceptible output, the machine-readable medium storing instructions executable by one or more machines, the instructions configured to cause the one or more machines to perform the actions comprising:
generating at a network-based marketplace platform, a virtual gift based on an item for sale at the network-based marketplace platform, the generating being performed at least in part by one or more processors;
generating, by a processor, interface information including the virtual gift, the interface information enabling purchase of the item on the network-based marketplace platform, the generating the interface information further comprising generating a message including a name of a sender of the virtual gift;
communicating, by a processor at the network-based marketplace platform, the interface information to a network-based social platform,
the interface information including an interface element that is configured to enable, upon selection, a purchase of the item on which the virtual gift is based from the network-based marketplace platform, the network-based marketplace platform and the network-based social platform being different platforms on a network;
controlling, by a processor at the network-based marketplace platform, a visually perceptible output representing the name of the sender of the virtual gift, the controlling being implemented based on the interface information such that the interface information causes the output representing the name of the sender of the virtual gift to be suppressed from display.

* * * * *